United States Patent
Xia et al.

(10) Patent No.: US 12,124,765 B2
(45) Date of Patent: Oct. 22, 2024

(54) AUDIO PLAYING METHOD AND ELECTRONIC DEVICE

(71) Applicant: Huawei Technologies Co., Ltd., Shenzhen (CN)

(72) Inventors: Shaohua Xia, Shenzhen (CN); Bin Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 16/623,287

(22) PCT Filed: Jun. 16, 2017

(86) PCT No.: PCT/CN2017/088837
§ 371 (c)(1),
(2) Date: Dec. 16, 2019

(87) PCT Pub. No.: WO2018/227637
PCT Pub. Date: Dec. 20, 2018

(65) Prior Publication Data
US 2020/0174741 A1    Jun. 4, 2020

(51) Int. Cl.
*G06F 3/04847* (2022.01)
*G06F 3/16* (2006.01)
(Continued)

(52) U.S. Cl.
CPC .......... *G06F 3/165* (2013.01); *G06F 3/04847* (2013.01); *H04M 1/72409* (2021.01); *H04N 21/43079* (2020.08); *H04M 1/72412* (2021.01)

(58) Field of Classification Search
CPC ................ G06F 3/165; G06F 3/04847; H04M 1/72409; H04M 1/7243; H04M 1/72442;
(Continued)

(56) References Cited

U.S. PATENT DOCUMENTS 7,376,441 B2 * 5/2008 Lee .................... H04M 1/72415
455/556.1
7,835,505 B2 * 11/2010 Toyama ........... H04N 21/41407
379/90.01
(Continued)

FOREIGN PATENT DOCUMENTS

CN    102104680 A    6/2011
CN    105574426 A    5/2016
(Continued)

OTHER PUBLICATIONS

Machine Translation and Abstract of Chinese Publication No. CN102104680, Jun. 22, 2011, 17 pages.
(Continued)

*Primary Examiner* — Andrey Belousov
(74) *Attorney, Agent, or Firm* — Conley Rose, P.C.

(57) ABSTRACT

An audio playing method includes obtaining, by an electronic device, to-be-played audio after the electronic device establishes a coupling to an external audio device, playing, by the electronic device, the to-be-played audio when the to-be-played audio is associated with the electronic device, and sending, by the electronic device, the to-be-played audio to the external audio device over the coupling when the to-be-played audio is associated with the external audio device.

20 Claims, 22 Drawing Sheets

TO
FIG. 6a-2

(51) Int. Cl.
*H04M 1/72409* (2021.01)
*H04N 21/43* (2011.01)
*H04M 1/72412* (2021.01)

(58) Field of Classification Search
CPC ......... H04M 1/72412; H04M 2250/22; H04M 1/72448; H04M 1/72454; H04M 1/72469; H04N 65/1059; H04N 21/43079; H04N 21/439; H04N 21/43615; H04N 21/4852; H04L 65/4069; H04L 65/1069; H04L 65/00; H04L 65/1059; H04L 65/1094; H04L 65/61; H04W 4/80
See application file for complete search history.

(56) References Cited

U.S. PATENT DOCUMENTS

| | | | | |
|---|---|---|---|---|
| 7,911,493 B2* | 3/2011 | Sarma | ............... | H04M 1/72412 348/14.01 |
| 8,185,155 B2 | 5/2012 | Chang et al. | | |
| 8,731,912 B1* | 5/2014 | Tickner | ................. | G10L 15/22 704/208 |
| 8,869,226 B2* | 10/2014 | Lafreniere | ....... | H04N 21/43615 725/133 |
| 9,350,868 B1* | 5/2016 | McChesney | ...... | H04M 3/53366 |
| 9,547,981 B1* | 1/2017 | Harold | ................... | H04W 4/50 |
| 2005/0064835 A1 | 3/2005 | Gusler et al. | | |
| 2005/0144247 A1* | 6/2005 | Christensen | ............ | H04L 51/04 709/207 |
| 2008/0056459 A1* | 3/2008 | Vallier | ................. | H04L 65/4007 379/88.12 |
| 2008/0057926 A1* | 3/2008 | Forstall | ............. | H04M 1/27475 455/415 |
| 2008/0109852 A1* | 5/2008 | Kretz | ..................... | H04W 4/80 725/62 |
| 2008/0298575 A1* | 12/2008 | Rondeau | ............... | H04M 3/436 379/211.01 |
| 2009/0005891 A1 | 1/2009 | Batson et al. | | |
| 2009/0143007 A1* | 6/2009 | Terlizzi | ............ | H04N 21/41407 455/3.06 |
| 2009/0210917 A1* | 8/2009 | Lafreniere | ......... | H04N 21/4882 725/106 |
| 2011/0269424 A1* | 11/2011 | Multer | ................ | H04L 67/1095 455/411 |
| 2012/0015613 A1* | 1/2012 | Zelson | .................... | H04W 4/02 455/90.1 |
| 2012/0038827 A1 | 2/2012 | Davis | | |
| 2013/0066908 A1* | 3/2013 | Niranjan | ............ | H04N 21/4828 707/E17.014 |
| 2013/0173715 A1* | 7/2013 | Song | ................... | H04L 67/1089 709/205 |
| 2014/0331133 A1* | 11/2014 | Coburn, IV | ......... | G11B 27/102 715/716 |
| 2014/0344876 A1 | 11/2014 | Yao et al. | | |
| 2015/0331940 A1* | 11/2015 | Manning | ............... | G06F 16/639 707/740 |
| 2016/0005064 A1* | 1/2016 | Pedroni | .............. | G06Q 30/0214 705/14.16 |
| 2016/0036962 A1* | 2/2016 | Rand | .................... | H04W 76/25 455/418 |
| 2016/0219431 A1* | 7/2016 | Belur | ................... | H04M 1/6091 |
| 2016/0353406 A1* | 12/2016 | Gianoukos | .......... | H04M 1/7243 |
| 2016/0360336 A1* | 12/2016 | Gross | ................ | H04M 1/72403 |
| 2017/0012981 A1* | 1/2017 | Obaidi | .................... | H04L 63/20 |
| 2017/0102914 A1 | 4/2017 | Hong | | |
| 2017/0109117 A1* | 4/2017 | Sugaya | ................. | G06F 3/0482 |
| 2018/0234550 A1* | 8/2018 | Lifson | ..................... | H04L 12/28 |
| 2018/0349011 A1* | 12/2018 | Morag | ................. | G06F 16/9535 |
| 2022/0038883 A1* | 2/2022 | Meyer | .................... | H04W 4/026 |

FOREIGN PATENT DOCUMENTS

| | | |
|---|---|---|
| CN | 105847903 A | 8/2016 |
| CN | 106161724 A | 11/2016 |
| CN | 106293559 A | 1/2017 |
| CN | 106657651 A | 5/2017 |
| WO | 2015187509 A1 | 12/2015 |

OTHER PUBLICATIONS

Machine Translation and Abstract of Chinese Publication No. CN105574426, May 11, 2016, 19 pages.
Machine Translation and Abstract of Chinese Publication No. CN105847903, Aug. 10, 2016, 11 pages.
Machine Translation and Abstract of Chinese Publication No. CN106161724, Nov. 23, 2016, 13 pages.
Machine Translation and Abstract of Chinese Publication No. CN106293559, Jan. 4, 2017, 17 pages.
Machine Translation and Abstract of Chinese Publication No. CN106657651, May 10, 2017, 25 pages.

* cited by examiner

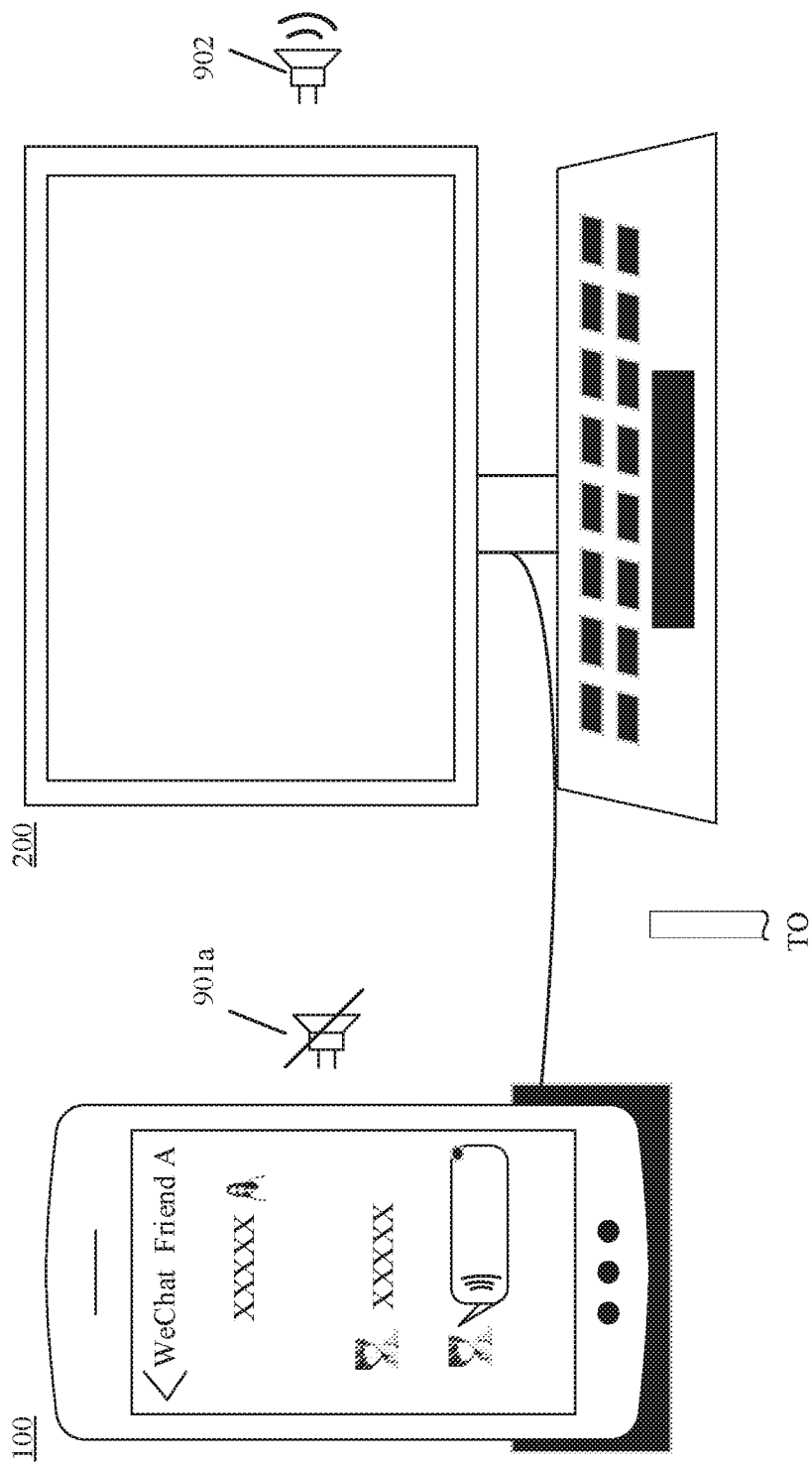

AUDIO PLAYING METHOD AND ELECTRONIC DEVICE

CROSS-REFERENCE TO RELATED APPLICATIONS

This application is a U.S. National Stage of International Patent Application No. PCT/CN2017/088837 filed on Jun. 16, 2017, which is hereby incorporated by reference in its entirety.

TECHNICAL FIELD

This application relates to the field of electronic device technologies, and in particular, to an audio playing method and an electronic device.

BACKGROUND

Currently, a mobile phone supports increasingly more functions. In addition to a basic call answering function, most mobile phones can play multimedia files such as an audio and a video. However, to facilitate carrying by users, most mobile phones have a relatively small size, and therefore have a relatively small display screen. In this case, when a multimedia file is played by using a mobile phone, user experience is relatively poor.

To improve user experience, in a current implementation, a mobile phone having a relatively small display screen is connected to another device having a relatively large display screen (for ease of description, the device is briefly referred to as a large-screen device below). In this way, a multimedia file on the mobile phone can be played by using the large-screen device.

During research, the inventor finds that such an application scenario exists: In the prior art, when audios from different multimedia applications are to be played at the same time, the to-be-played audios of these multimedia applications are all played by using a same device (for example, a large-screen device or a mobile phone), and therefore, user experience is relatively poor. For example, in a multi-party conference scenario, in a process of playing an audio by using a speaker of a large-screen device, if a user plays voice messages from privacy applications such as WeChat and QQ on a mobile phone, these voice messages are played by using the speaker of the large-screen device, and consequently, user privacy is leaked.

SUMMARY

Embodiments of this application provide an audio playing method and an electronic device, so as to resolve a prior-art problem of privacy leakage caused because audios from different multimedia applications are all played by using a speaker of an external audio device.

To achieve the foregoing objective, the following technical solutions are used in the embodiments of this application.

According to a first aspect, an audio playing method is provided, where the method includes: after an electronic device establishes a connection to an external audio device, obtaining, by the electronic device, a to-be-played audio; and when the to-be-played audio is associated with the electronic device, playing, by the electronic device, the to-be-played audio; or when the to-be-played audio is associated with the external audio device, sending, by the electronic device, the to-be-played audio to the external audio device over the established connection, so that the external audio device plays the to-be-played audio.

According to the audio playing method provided in this embodiment of this application, after the electronic device establishes the connection to the external audio device, for a to-be-played audio, in this embodiment of this application, if the to-be-played audio is associated with the electronic device, the to-be-played audio is played by using the electronic device. If the to-be-played audio is associated with the external audio device, the to-be-played audio device is played by using the external audio device. In this way, in comparison with the prior art in which the to-be-played audio is played by using a same device, in this embodiment of this application, the to-be-played audio can be played by using a device associated with the audio.

In a possible design of the first aspect, the to-be-played audio is a to-be-played audio of a first application installed on the electronic device. That the to-be-played audio is associated with the electronic device includes: The first application is any one of first-type applications. Correspondingly, that the to-be-played audio is associated with the external audio device includes: The first application is any one of second-type applications.

The first-type applications and the second-type applications are two types of applications preset by a user. For example, based on a requirement of the user, the user sets some applications that are related to privacy and that are installed on the electronic device to the first-type applications, and sets some applications that are not related to privacy and that are installed on the electronic device to the second-type applications. Alternatively, the first-type applications and the second-type applications are two types of applications set by the electronic device based on application attributes. For example, the electronic device automatically sets, based on a result such as big data analysis, applications installed on the electronic device to privacy applications and non-privacy applications.

In this implementation, for a to-be-played audio, after an application is pre-classified, the electronic device can automatically determine which device is used to play the to-be-played audio. In a scenario in which a mobile phone is connected to a large-screen device, after the method in this embodiment of this application is used, an audio of a multimedia application is set to be associated with the large-screen device, and an audio of a social application is set to be associated with the mobile phone. The mobile phone can play the audio of the multimedia application by using a speaker of the large-screen device, and play an audio of an application related to user privacy, for example, a WeChat voice message, by using the mobile phone. This helps protect the user privacy.

In a possible design of the first aspect, the to-be-played audio is a to-be-played audio of a first application installed on the electronic device. Correspondingly, that the to-be-played audio is associated with the electronic device includes: a quantity of historical times of playing the audio of the first application by using the electronic device is greater than or equal to a first threshold. Correspondingly, that the to-be-played audio is associated with the external audio device includes: a quantity of historical times of playing the audio of the first application by using the external audio device is greater than a second threshold.

In this implementation, based on a historical playing record of a user, when the historical playing record indicates that the user frequently uses the electronic device to play an audio of an application or audios of some applications, for a to-be-played audio from the application, the to-be-played audio is still played by using the electronic device. When the historical playing record indicates that the user frequently uses the external audio device to play an audio of an application or audios of some applications, for a to-be-played audio from the application, the audio from the application is still played by using the external audio device. Therefore, in this implementation, for a to-be-played audio, the electronic device can automatically determine which device is used to play the to-be-played audio.

In a possible design of the first aspect, the to-be-played audio is a to-be-played audio of a first application installed on the electronic device. Correspondingly, that the to-be-played audio is associated with the electronic device includes: The electronic device currently displays an interface of the first application. Correspondingly, that the to-be-played audio is associated with the external audio device includes: The electronic device sends first display data to the external audio device, so that the external audio device currently displays the interface of the first application.

In this implementation, the to-be-played audio belongs to the first application. For the external audio device having a display function, when the interface of the first application is displayed by using the electronic device, it indicates that a user may be currently operating the first application by using the electronic device, and the to-be-played audio from the first application is played by using the electronic device. When the interface of the first application is displayed by using the external audio device, it indicates that the user may be currently operating the first application by using the external audio device, and the to-be-played audio from the first application is played by using the external audio device.

In a possible design of the first aspect, that the to-be-played audio is associated with the electronic device includes: obtaining a first instruction entered by a user, where the first instruction is used to instruct to play the to-be-played audio on the electronic device. Correspondingly, that the to-be-played audio is associated with the external audio device includes: obtaining a second instruction entered by the user, where the second instruction is used to instruct to play the to-be-played audio on the external audio device.

In this implementation, a device instructed by the user is selected, according to the instruction of the user, to play the to-be-played audio.

In a possible design of the first aspect, the method further includes: presenting, by the electronic device, user prompt information, where the user prompt information is used to prompt the user which device is used to play the to-be-played audio. Correspondingly, the obtaining a first instruction entered by a user includes: obtaining the first instruction triggered by the user for the user prompt information. Correspondingly, the obtaining a second instruction entered by the user includes: obtaining the second instruction triggered by the user for the user prompt information.

In this implementation, each time before a to-be-played audio is played, the user is prompted to select a device for playing the to-be-played audio, and the to-be-played audio is played by using the device selected by the user.

In a possible design of the first aspect, that the to-be-played audio is associated with the electronic device includes: The to-be-played audio is a telephony audio. The telephony audio includes an incoming call ringtone, a prompt message before a call is connected when the call is made, and a voice message in a voice call process after a voice call is established.

In this implementation, when there is a telephony audio, the telephony audio is played by using the electronic device by default.

In a possible design of the first aspect, before the obtaining, by the electronic device, a to-be-played audio, the method further includes: playing, by the electronic device, the first audio. Correspondingly, the sending, by the electronic device, the to-be-played audio to the external audio device includes: sending, by the electronic device, the to-be-played audio to the external audio device at the same time when the electronic device plays the first audio, so that the external audio device plays the to-be-played audio at the same time when the electronic device plays the first audio.

In this implementation, in a process in which the electronic device plays the first audio, there is a to-be-played audio. After the electronic device determines that the to-be-played audio is associated with the external audio device, the electronic device sends the to-be-played audio to the external audio device, and the external audio device plays the to-be-played audio. In this process, the first audio that is being currently played by the electronic device does not need to be paused. To be specific, the external audio device plays the new to-be-played audio at the same time when the electronic device plays the first audio.

Alternatively, before the obtaining, by the electronic device, a to-be-played audio, the method further includes: sending, by the electronic device, the first audio to the external audio device, so that the external audio device plays the first audio. The playing, by the electronic device, the to-be-played audio includes: playing, by the electronic device, the to-be-played audio at the same time when the external audio device plays the first audio.

In this implementation, in a process in which the external audio device plays the first audio, there is a to-be-played audio. After the electronic device determines that the to-be-played audio is associated with the electronic device, the electronic device does not need to pause the first audio that is being played by the external audio device, to be specific, the electronic device plays the to-be-played audio device at the same time when the external audio device plays the first audio.

According to a second aspect, an audio playing method is provided, where the method includes: after an electronic device establishes a connection to an external audio device, playing, by the electronic device, a first audio; obtaining, by the electronic device, a to-be-played second audio; and sending, by the electronic device, the second audio to the external audio device, so that the external audio device plays the second audio at the same time when the electronic device plays the first audio.

In a possible design of the second aspect, the sending, by the electronic device, the second audio to the external audio device includes: when the second audio is associated with the external audio device, sending, by the electronic device, the second audio to the external audio device.

According to a third aspect, an audio playing method is provided, where the method includes: after the electronic device establishes a connection to an external audio device, sending, by the electronic device, a first audio to the external audio device over the connection, so that the external audio device plays the first audio; obtaining, by the electronic device, a to-be-played second audio; and playing, by the electronic device, the second audio at the same time when the external audio device plays the first audio.

In a possible design of the third aspect, the playing, by the electronic device, the second audio includes: when the second audio is associated with the electronic device, playing, by the electronic device, the second audio.

According to a fourth aspect, an electronic device is provided, where the electronic device includes: a connection unit, configured to establish a connection between the electronic device and an external audio device; an obtaining unit, configured to obtain a to-be-played audio; a playing unit, configured to play the to-be-played audio when the to-be-played audio obtained by the obtaining unit is associated with the electronic device; and a sending unit, configured to: when the to-be-played audio obtained by the obtaining unit is associated with the external audio device, send the to-be-played audio to the external audio device over the established connection, so that the external audio device plays the to-be-played audio.

In a possible design of the fourth aspect, the to-be-played audio is a to-be-played audio of a first application installed on the electronic device. The playing unit is further configured to play the to-be-played audio when the first application is any one of first-type applications. The sending unit is further configured to: when the first application is any one of second-type applications, send the to-be-played audio to the external audio device over the established connection, so that the external audio device plays the to-be-played audio.

The first-type applications and the second-type applications are two types of applications preset by a user. Alternatively, the first-type applications and the second-type applications are two types of applications set by the electronic device based on application attributes.

In a possible design of the fourth aspect, the to-be-played audio is a to-be-played audio of a first application installed on the electronic device. The playing unit is further configured to play the to-be-played audio when a quantity of historical times of playing the audio of the first application by using the electronic device is greater than or equal to a first threshold. The sending unit is further configured to: when a quantity of historical times of playing the audio of the first application by using the external audio device is greater than a second threshold, send the to-be-played audio to the external audio device over the established connection, so that the external audio device plays the to-be-played audio.

In a possible design of the fourth aspect, the to-be-played audio is a to-be-played audio of a first application installed on the electronic device. The electronic device further includes a display unit, configured to display an interface of the first application. The playing unit is further configured to play the to-be-played audio when the display unit displays the interface of the first application. The sending unit is further configured to send first display data to the external audio device, so that the external audio device currently displays the interface of the first application. When the external audio device currently displays the interface of the first application, the sending unit is further configured to send the to-be-played audio to the external audio device over the established connection, so that the external audio device plays the to-be-played audio.

In a possible design of the fourth aspect, the obtaining unit is further configured to obtain a first instruction entered by a user, where the first instruction is used to instruct to play the to-be-played audio on the electronic device. Correspondingly, the playing unit is further configured to play the to-be-played audio when the obtaining unit obtains the first instruction. The obtaining unit is further configured to obtain a second instruction entered by the user, where the second instruction is used to instruct to play the to-be-played audio on the external audio device. The sending unit is further configured to send the to-be-played audio to the external audio device over the established connection when the obtaining unit obtains the second instruction, so that the external audio device plays the to-be-played audio.

In a possible design of the fourth aspect, the electronic device further includes a display unit, configured to present user prompt information, where the user prompt information is used to prompt the user which device is used to play the to-be-played audio. Correspondingly, the obtaining unit is configured to obtain the first instruction triggered by the user for the user prompt information. Correspondingly, the obtaining unit is further configured to obtain the second instruction triggered by the user for the user prompt information.

In a possible design of the fourth aspect, that the to-be-played audio is associated with the electronic device includes: The to-be-played audio is a telephony audio. The telephony audio includes an incoming call ringtone, a prompt message before a call is connected when the call is made, and a voice message in a voice call process after a voice call is established.

In a possible design of the fourth aspect, the playing unit is further configured to play the first audio before the electronic device obtains the to-be-played audio. Correspondingly, the sending unit is further configured to send the to-be-played audio to the external audio device at the same time when the playing unit plays the first audio, so that the external audio device plays the to-be-played audio at the same time when the electronic device plays the first audio.

Alternatively, the sending unit is further configured to send the first audio to the external audio device, so that the external audio device plays the first audio. The playing unit is further configured to play the to-be-played audio at the same time when the external audio device plays the first audio.

According to a fifth aspect, an electronic device is provided, where the electronic device includes: a processor, an audio circuit, a transmitter, and a communications interface that are connected through a bus. The communications interface is configured to establish a connection between the electronic device and an external audio device. The audio circuit is configured to play a first audio. The processor is configured to obtain a to-be-played second audio. The transmitter is configured to send the second audio to the external audio device, so that the external audio device plays the second audio at the same time when the electronic device plays the first audio.

In a possible design of the fifth aspect, the transmitter is specifically configured to: when the second audio is associated with the external audio device, send the second audio to the external audio device.

In a possible design of the fifth aspect, the second audio is a to-be-played audio of a first application installed on the electronic device. The processor is further configured to: when the first application is a first preset application or any one of first-type preset applications, determine that the second audio is associated with the external audio device.

In a possible design of the fifth aspect, the second audio is a to-be-played audio of a first application installed on the electronic device. The processor is further configured to: when a quantity of historical times of playing the audio of the first application by using the external audio device is greater than or equal to a first threshold, determine that the second audio is associated with the external audio device.

In a possible design of the fifth aspect, the second audio is a to-be-played audio of a first application installed on the electronic device. The processor is further configured to:

when the electronic device sends display data to the external audio device, determine, when the external audio device currently displays an interface of the first application, that the second audio is associated with the external audio device.

In a possible design of the fifth aspect, the electronic device further includes an input device, configured to obtain a first instruction entered by a user, where the first instruction is used to instruct to play the second audio on the external audio device. The processor is further configured to: when the input device receives the first instruction entered by the user, determine that the second audio is associated with the external audio device.

In a possible design of the fifth aspect, the electronic device further includes a display, configured to present user prompt information, where the user prompt information is used to prompt the user which device is used to play the second audio. The input device is further configured to obtain the first instruction entered by the user for the user prompt information.

In a possible design of the fifth aspect, the first audio is an audio of a first multimedia application installed on the electronic device; and the second audio is an audio of a second multimedia application installed on the electronic device.

In a possible design of the fifth aspect, the first audio is a telephony audio, the second audio is an audio of a first multimedia application installed on the electronic device, and the telephony audio includes an incoming call prompt ringtone, a prompt tone before a call is connected when the call is made, and a voice message in a voice call process after a voice call is established.

In a possible design of the fifth aspect, the first audio is an audio of a social application installed on the electronic device, the audio of the social application includes a voice message, and the second audio is an audio of a multimedia application installed on the electronic device.

According to a sixth aspect, an electronic device is provided, where the electronic device includes: a processor, an audio circuit, a transmitter, and a communications interface that are connected through a bus. The communications interface is configured to establish a connection between the electronic device and an external audio device. The transmitter is configured to send a first audio to the external audio device over the connection, so that the external audio device plays the first audio. The processor is configured to obtain a to-be-played second audio. The audio circuit is configured to play the second audio at the same time when the external audio device plays the first audio.

In a possible design of the sixth aspect, the audio circuit is further configured to play the second audio when the second audio is associated with the electronic device.

In a possible design of the sixth aspect, the second audio is a to-be-played audio of a first application installed on the electronic device. The processor is further configured to: when the first application is a second preset application or any one of second-type preset applications, determine that the second audio is associated with the electronic device.

In a possible design of the sixth aspect, the second audio is a to-be-played audio of a first application installed on the electronic device. The processor is further configured to: when a quantity of historical times of playing the audio of the first application by using the electronic device is greater than or equal to a first threshold, determine that the second audio is associated with the electronic device.

In a possible design of the sixth aspect, the second audio is a to-be-played audio of a first application installed on the electronic device. The electronic device further includes a display, configured to display an interface of the first application. The processor is further configured to: when the display displays the interface of the first application, determine that the second audio is associated with the electronic device.

In a possible design of the sixth aspect, the electronic device further includes an input device, configured to obtain a second instruction entered by a user, where the second instruction is used to instruct to play the second audio on the electronic device. The processor is configured to: when the input device receives the second instruction, determine that the second audio is associated with the electronic device.

In a possible design of the sixth aspect, the electronic device further includes a display, configured to present user prompt information, where the user prompt information is used to prompt the user which device is used to play the second audio. The input device is further configured to obtain the second instruction triggered by the user for the user prompt information.

In a possible design of the sixth aspect, the first audio is an audio of a first multimedia application installed on the electronic device; and the second audio is an audio of a second multimedia application installed on the electronic device.

In a possible design of the sixth aspect, the first audio is an audio of a multimedia application installed on the electronic device, the second audio is a telephony audio, and the telephony audio includes an incoming call prompt ringtone, a prompt tone before a call is connected when the call is made, and a voice message in a voice call process after a voice call is established.

In a possible design of the sixth aspect, the first audio is an audio of a multimedia application installed on the electronic device, the second audio is an audio of a social application installed on the electronic device, and the audio of the social application includes a voice message.

According to a seventh aspect, an electronic device is provided, including: a communications interface, an audio circuit, a transmitter, one or more processors, a memory, and one or more programs, where the one or more programs are stored in the memory, the one or more programs include an instruction, and when the instruction is executed by the electronic device, the electronic device is enabled to perform the following steps: after the electronic device establishes a connection to an external audio device through the communications interface, playing, by the electronic device, a first audio by using the audio circuit; obtaining, by the electronic device, a to-be-played second audio by using the processor; and sending, by the electronic device, the second audio to the external audio device by using the transmitter, so that the external audio device plays the second audio at the same time when the electronic device plays the first audio by using the audio circuit.

According to an eighth aspect, an electronic device is provided, including: a communications interface, an audio circuit, a transmitter, one or more processors, a memory, and one or more programs, where the one or more programs are stored in the memory, the one or more programs include an instruction, and when the instruction is executed by the electronic device, the electronic device is enabled to perform the following steps: after the electronic device establishes a connection to an external audio device through the communications interface, sending, by the electronic device, a first audio to the external audio device by using the transmitter, so that the external audio device plays the first audio; obtaining, by the electronic device, a to-be-played second audio by using the processor; and playing the second audio by using the audio circuit at the same time when the external audio device plays the first audio.

According to a ninth aspect, a computer readable storage medium is provided, where the computer readable storage medium stores an instruction, and when the instruction is run on an electronic device, the electronic device is enabled to perform the audio playing method according to the first aspect, the second aspect, or the third aspect.

According to a tenth aspect, a computer program product including an instruction is provided, where when the computer program product is run on an electronic device, the electronic device is enabled to perform the audio playing method according to the first aspect, the second aspect, or the third aspect.

BRIEF DESCRIPTION OF DRAWINGS

FIG. 6a-1 and FIG. 6a-2 are a schematic diagram of an application scenario of playing an audio of a privacy application by using an audio playing method according to an embodiment of this application;

FIG. 6c-1 and FIG. 6c-2 are a schematic diagram of an application scenario of playing an audio of a non-privacy application by using an audio playing method according to an embodiment of this application;

FIG. 8a-1 and FIG. 8a-2 are a schematic diagram of an application scenario of playing a WeChat voice message by using an audio playing method according to an embodiment of this application;

FIG. 8b-1 and FIG. 8h-2 are a schematic diagram of an application scenario of playing an audio/a video on a large-screen device by using an audio playing method according to an embodiment of this application;

DESCRIPTION OF EMBODIMENTS

The following terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features. In the descriptions of the embodiments of this application, unless otherwise specified, "a plurality of" means two or more than two.

An embodiment of this application provides an audio playing method. The method may be applied to a scenario in which an electronic device is connected to an external audio device. The electronic device may be any device such as a mobile phone, a wearable device, an augmented reality (Augmented Reality, AR)/virtual reality (Virtual Reality, VR) device, a tablet computer, a notebook computer, an ultra-mobile personal computer (Ultra-mobile Personal Computer, UMPC), a netbook, or a personal digital assistant (Personal Digital Assistant, PDA). This is not limited in this embodiment of this application. The external audio device is any device having an audio playing function. For example, the external audio device may be an acoustic device. For another example, the external audio device may further have a display. For example, the external audio device may be a device such as a personal computer or a television. The electronic device may establish a connection to the external audio device in a wired communication mode or a wireless communication mode. After the electronic device establishes the connection to the external audio device, it may be understood that the electronic device has two audio playing devices. The electronic device is a control device, and the external audio device is a slave device. The electronic device may play an audio by using an audio output device of the electronic device, or may play an audio by using the external audio device.

For example, the electronic device is a mobile phone, and the external audio device is a large-screen device having both an audio playing function and a display function.

Figure 1A:
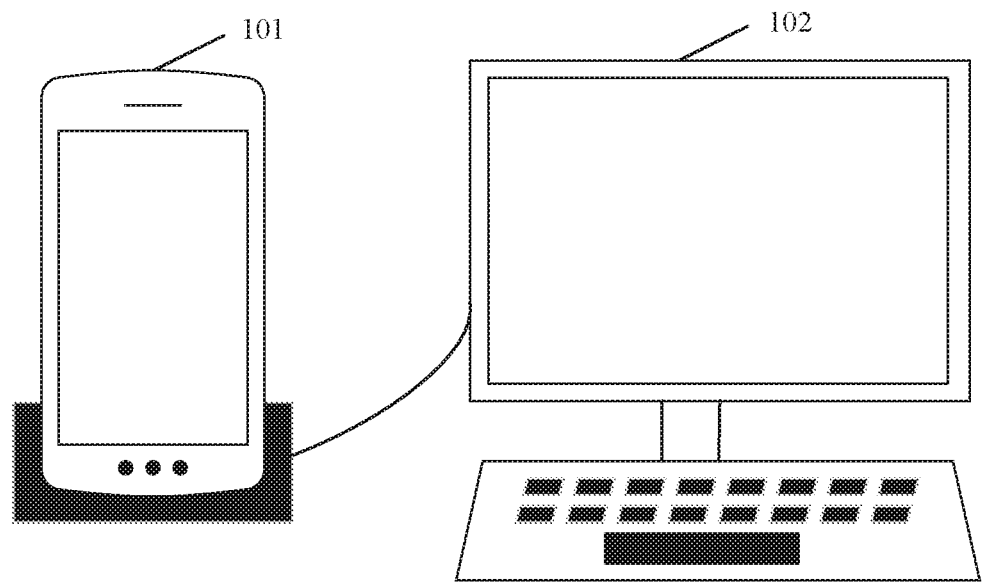
FIG. 1a is a schematic diagram of a wired connection between a mobile phone and a large-screen device according to an embodiment of this application.

Referring to FIG. 1a, the mobile phone 100 may establish a connection to a large-screen device 200 in a wired communication mode. The wired communication mode may be specifically a mode in which the mobile phone is connected to the large-screen device through a universal serial bus (Universal Serial Bus, USB) interface or a high definition multimedia interface (High Definition Multimedia. Interface, HDMI) interface.

Figure 1B:
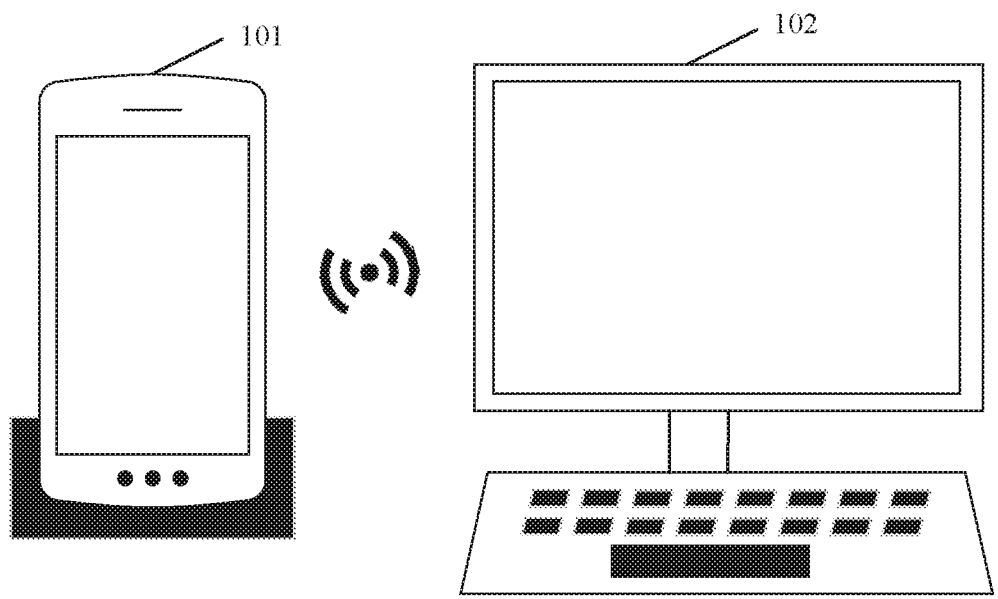
FIG. 1b is a schematic diagram of a wireless connection between a mobile phone and a large-screen device according to an embodiment of this application.

Referring to FIG. 1b, the mobile phone 100 may establish a connection to a large-screen device 200 in a wireless communication mode. The wireless communication mode may be specifically a Bluetooth (Bluetooth, BT) connection, a wireless fidelity (Wireless Fidelity, Wi-Fi) connection, or the like.

During research, the inventor finds that if an audio playing policy is predefined in a mobile phone system, and an audio device is specified, according to the audio playing policy, as a device for playing an audio, all audios are played by using the specified audio device. For example, most mobile phones have audio devices such as earphones and speakers. A mobile phone may alternatively be connected to another external audio device. For example, if the mobile phone is connected to earphones, the earphones may also be used as an external audio device of the mobile phone. Alternatively, if the mobile phone is connected to a large-screen device, an audio device of the large-screen device may also be used as an external audio device of the mobile phone. Therefore, the foregoing earphones, speakers, and external audio devices may all be considered as audio devices of the mobile phone. At present, a voice policy defined for most mobile phones is specifically as follows: When a mobile phone is not connected to another device, an audio is played by using earphones by default. In some cases, if a user chooses to play an audio by using a speaker, the mobile phone plays the audio by using the speaker based on the selection of the user. If it is detected that earphones are connected to the mobile phone, an audio is played by using the earphones by default. If it is detected that the mobile phone is connected to another device, an audio is played, by default, by using an audio device of the another device connected to the mobile phone. Referring to this audio playing policy, in a scenario shown in FIG. 1a or FIG. 1b, if the audio playing policy defined for the mobile phone is setting the audio device of the large-screen device to a default audio device, all audios are played by using the audio device of the large-screen device.

Specifically, referring to FIG. 2, specific technical implementation of the audio playing policy is as follows: During audio processing, an operating system of the mobile phone may be divided into an application layer (Application Layer), a framework layer (Framework Layer), an audio hub service layer (Audio Flinger), a hardware abstraction layer (Hardware Abstraction Layer, HAL), and kernel space (kernel space) based on logic for processing an audio service. To-be-played audios on the mobile phone include an audio 21 from an upper-layer application and a telephony voice signal 22, and a process in which the mobile phone processes the audios includes the following content.

Figure 2:
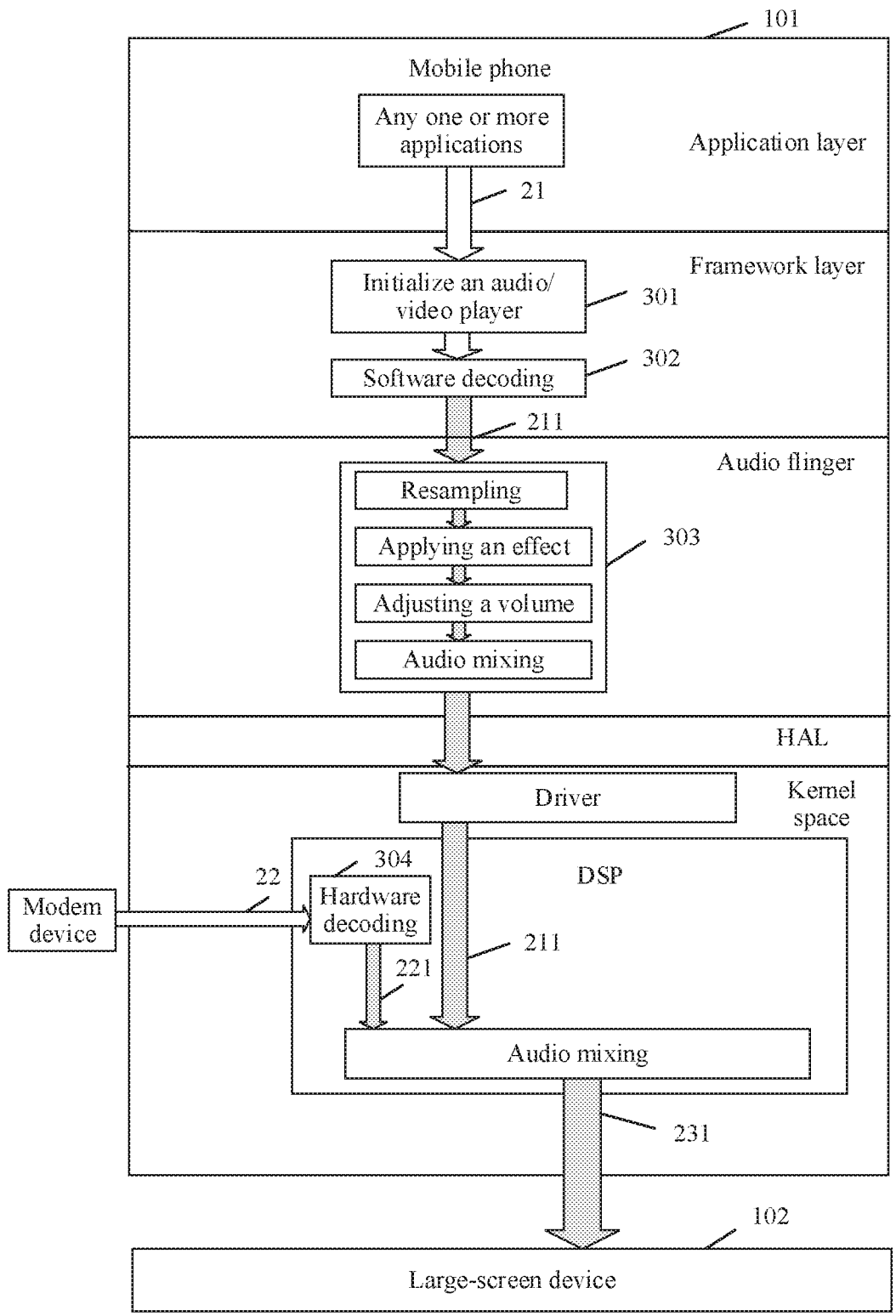
FIG. 2 is a schematic diagram of a process of processing an audio service after a mobile phone is connected to a large-screen device in the prior art.

When the audio 21 from the upper-layer application (for example, an audio of a video playing application) is detected, the framework layer initializes an audio player on the mobile phone (this is shown as a process 301 in FIG. 2), decodes the audio 21 (the decoding process is a software decoding process, therefore may be referred to as software decoding, and is shown as a process 302 in FIG. 2), to obtain a decoded audio 211, and transfers the decoded audio 211 to the audio hub service layer. The audio hub service layer performs the following processing process on the decoded audio (the processing is shown as a process 303 in FIG. 2): resampling (resample), applying an effect (apply effect), adjusting a volume (adjust volume), and audio mixing (mixer), and then forwards, by using the hardware abstraction layer, a processed audio to the kernel space for processing.

The telephony voice signal 22 from a modem is directly decoded by a digital signal processor (Digital Signal Processor, DSP) located in the kernel space (the decoding process is referred to as hardware decoding, and is shown as a process 304 in FIG. 2), to obtain a decoded telephony voice signal 221. To meet a playing requirement of the mobile phone, the DSP may further perform a processing process such as resampling on the decoded telephony voice signal 221.

After the DSP in the kernel space performs audio mixing on the decoded audio 21 and audio mixing on the decoded telephony voice signal 221, the DSP sends a mixed audio 231 to the large-screen device, and the large-screen device plays the mixed audio 231.

It can be learned that in the foregoing process, after the mobile phone performs, by using the DSP, audio mixing on all audios (the audio 21 from the upper-layer application and the telephony voice signal 22 are used as an example in FIG. 2) that are currently to be played, the audio device of the large-screen device plays mixed audios, Consequently, it is relatively inconvenient for the user to use. For example, in a multi-party conference scenario, the user plays a multimedia video on the mobile phone by using the large-screen device. In a process of watching an audio/a video by using the large-screen device, if a WeChat voice message is received, the user wants to obtain content of the voice message, and taps the voice message, content of the voice message is played by using a speaker of the large-screen device, and consequently, user privacy is leaked. For another example, if there is a new incoming call when the user is playing the multimedia video on the mobile phone by using the large-screen device, after the user answers the call by using the mobile phone, the audio/the video on the large-screen device is paused, or both a telephony voice and the audio played by the large-screen device are played through audio mixing by the mobile phone. This causes a relatively poor auditory effect.

An embodiment of this application provides an audio playing method. The method provided in this embodiment of this application is applicable to the foregoing scenario.

Figure 3:
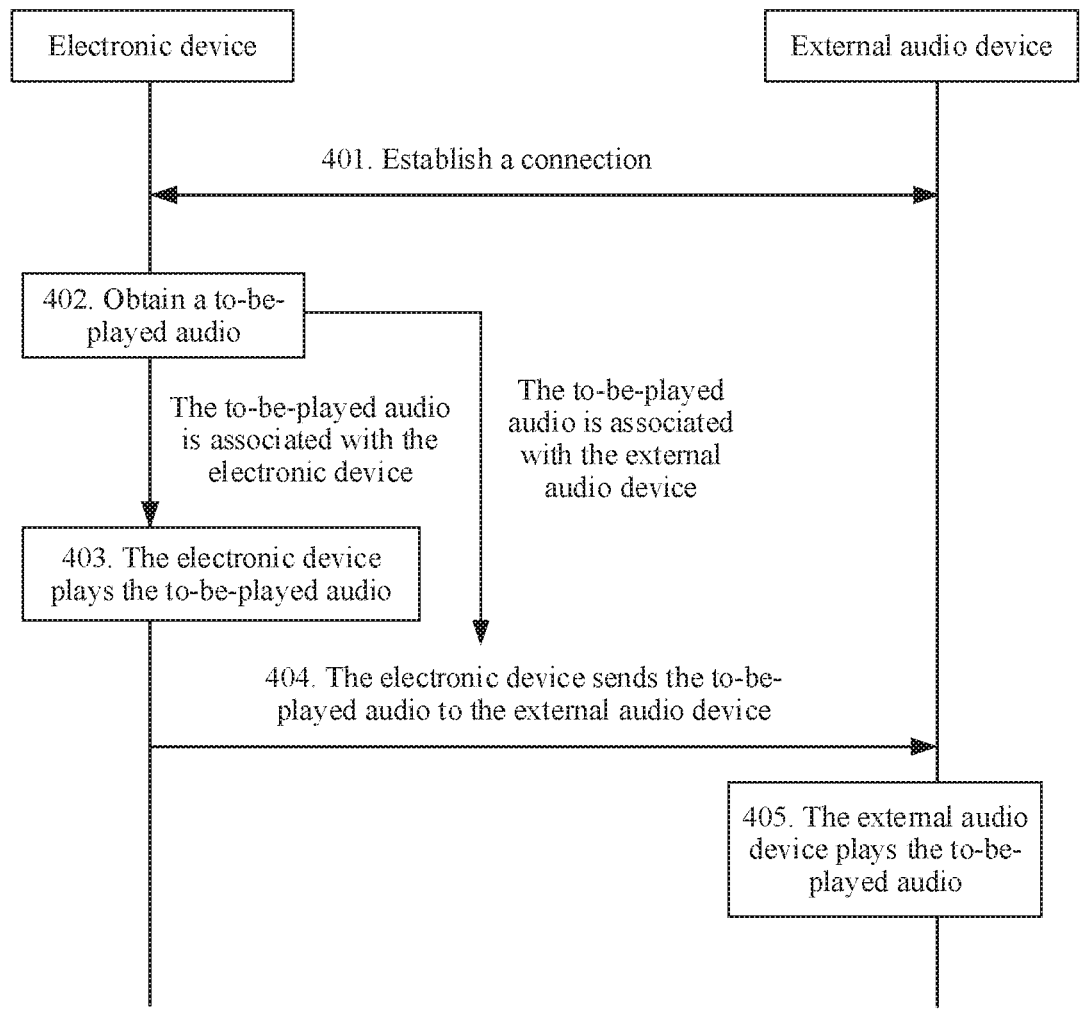
FIG. 3 is a schematic flowchart of an audio playing method according to an embodiment of this application.

Referring to FIG. 3, the method provided in this embodiment of this application includes the following steps.

401. An electronic device establishes a connection to an external audio device.

The connection between the electronic device and the external audio device includes a wired connection and a wireless connection. The wired connection mode includes a wired connection between the electronic device and the external audio device through a USB interface or an HDMI interface. The wireless connection mode includes a connection mode such as a Bluetooth connection or a Wi-Fi connection.

402. The electronic device obtains a to-be-played audio.

The to-be-played audio includes an audio of any type or in any form. Specifically, the to-be-played audio includes an audio from an audio/video application program, for example, an audio of an audio/video application program such as Tencent video, iQIYI video, or Youku video installed on a mobile phone. The to-be-played audio further includes an audio from a game application program, further includes an audio from an alarm, further includes a voice message from a social application program such as WeChat or QQ, further includes a telephony voice, and further includes a voice prompt message such as application update or message push.

In this step, when a device associated with the to-be-played audio is the electronic device, the following step 403 is performed to play the to-be-played audio by using only the electronic device. When a device associated with the to-be-played audio is the external audio device, the following steps 404 and 405 are performed to play the to-be-played audio by using only the external audio device.

403. The electronic device plays the to-be-played audio by using the electronic device.

404. The electronic device sends the to-be-played audio to the external audio device.

405. The electronic device plays the to-be-played audio by using the external audio device.

According to the foregoing method, the electronic device determines the device associated with the to-be-played audio, and plays the to-be-played audio by using the associated device. In this way, audios associated with different electronic devices can be distinguished, and can be played by using different electronic devices.

For example, when the foregoing method is applied to the scenario shown in FIG. 1a or FIG. 1b, after the foregoing method provided in this embodiment of this application is used, applications installed on a mobile phone are classified into an application associated with the mobile phone and an application associated with a large-screen device, an audio from the application associated with the mobile phone is played by using an audio device of the mobile phone, and an audio from the application associated with the large-screen device is played by using an audio device of the large-screen device.

Figure 4:
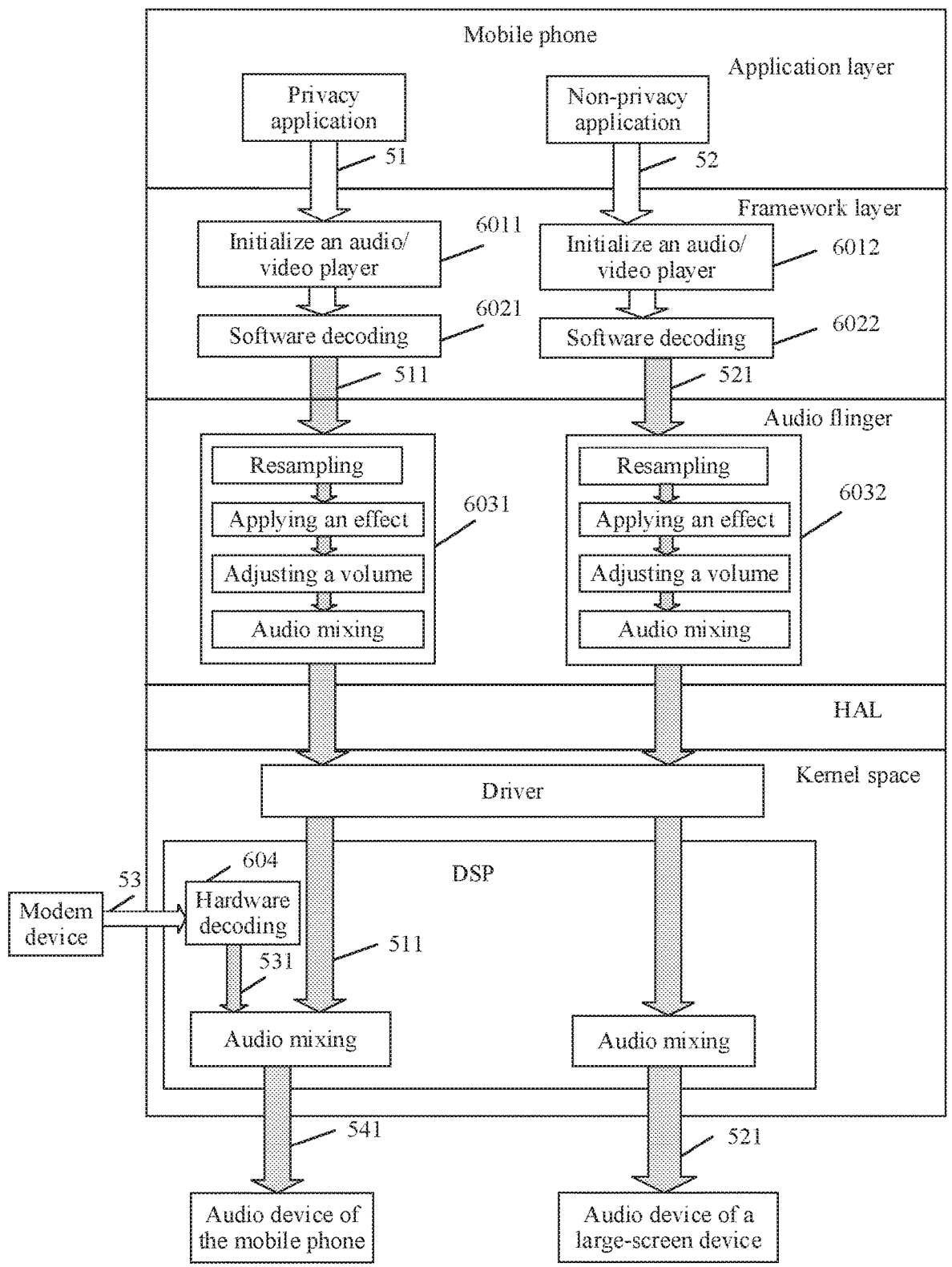
FIG. 4 is a schematic diagram of a process of processing an audio service by using a method according to an embodiment of this application.

Referring to FIG. 4, in a possible implementation, when an audio 51 from the application associated with the mobile phone is detected, a framework layer initializes an audio player on the mobile phone (this is shown as a process 6011 in FIG. 4), decodes the audio 51 (the decoding process is a software decoding process, therefore may be referred to as software decoding, and is shown as a process 6021 in FIG. 4), to obtain a decoded audio 511, and transfers the decoded audio 511 to an audio hub service layer. The audio hub service layer performs the following processing process on the decoded audio (the processing is shown as a process 6031 in FIG. 4): resampling (resample), applying an effect (apply effect), adjusting a volume (adjust volume), and audio mixing (mixer), and then forwards, by using a hardware abstraction layer, a processed audio to kernel space for processing. A DSP located in the kernel space plays the audio by using the audio device of the mobile phone.

For an audio 52 from the application associated with the large-screen device, the framework layer initializes the audio player on the mobile phone (this is shown as a process 6012 in FIG. 4), decodes the audio 52 (the decoding process is a software decoding process, therefore may be referred to as software decoding, and is shown as a process 6022 in FIG. 4), to obtain a decoded audio 521, and transfers the decoded audio 521 to the audio hub service layer. The audio hub service layer performs the following processing process on the decoded audio (the processing is shown as a process 6032 in FIG. 4): resampling (resample), applying an effect (apply effect), adjusting a volume (adjust volume), and audio mixing (mixer), and then forwards, by using the hardware abstraction layer, a processed audio to the kernel space for processing. The DSP located in the kernel space sends the audio to the large-screen device, and the large-screen device plays the audio.

It can be learned that in the implementation shown in FIG. 4, the audio from the application associated with the mobile phone and the audio from the application associated with the large-screen device are separately processed, and are separately output by using corresponding devices.

In addition, because a telephony voice signal is usually related to personal privacy, a telephony voice is output by using the mobile phone. The DSP detects a telephony voice signal 53 from a modem, and the DSP located in the kernel space directly decodes the telephony voice signal 53 (this is shown as a process 604 in FIG. 4), to obtain a decoded telephony voice signal 531. To meet a playing requirement of the mobile phone, the DSP may further perform a processing process such as resampling on the decoded telephony voice signal 531, and then play a processed telephony voice signal by using the audio device of the mobile phone.

It should be noted that in a process of playing a voice by using the mobile phone, an audio of another application program such as WeChat installed on the mobile phone needs to be played at the same time, and a WeChat voice is an audio associated with the mobile phone and needs to be played by using the mobile phone. Another implementation may be: mixing a telephony voice signal and a WeChat voice message for playing. However, to avoid mixing of a telephony voice and an audio voice from WeChat, in this embodiment of this application, a corresponding telephony audio voice and a corresponding WeChat voice may be separately output by using different audio devices of the mobile phone. For example, a telephony voice signal is played by using earphones, and an audio from WeChat is played by using a speaker. In another implementation, to ensure a priority of a telephony voice, in the foregoing scenario, a user is allowed to play only the telephony voice, but is not allowed to play the WeChat voice message. After the telephony voice is played, the WeChat voice is played.

It is considered that in a possible scenario in actual application, before the electronic device obtains the to-be-played audio, the electronic device is playing an audio. For example, after the electronic device establishes the connection to the external audio device, the electronic device plays a first audio, and in a process in which the electronic device plays the first audio, there is a new to-be-played audio (which is described as a second audio below). In this case, a processing procedure in this embodiment of this application is as follows: The electronic device continues to play the first audio, and sends the second audio to the external audio device at the same time when the electronic device plays the first audio, and the external audio device plays the second audio. Optionally, in this step, the electronic device may alternatively send the second audio to the external audio device when the electronic device determines that the second audio is associated with the external audio device.

Therefore, in an implementation, after the electronic device establishes the connection to the external audio device, the electronic device plays the first audio. The electronic device obtains the to-be-played audio (which is described as the second audio herein), and the electronic device sends the second audio to the external audio device, so that the external audio device plays the second audio at the same time when the electronic device plays the first audio.

For example, the first audio is an audio of a first multimedia application installed on the electronic device. The second audio is an audio of a second multimedia application installed on the electronic device.

For example, the first audio is a telephony audio, and the second audio is an audio of a first multimedia application installed on the electronic device. The telephony audio includes an incoming call prompt ringtone, a prompt tone before a call is connected when the call is made, and a voice message in a voice call process after a voice call is established.

For example, the mobile phone is connected to a Bluetooth speaker. When answering a call by using the mobile phone, the user may open a music application on the mobile phone, and an audio from the music application may be played by using the Bluetooth speaker. In a process of playing music by using the Bluetooth speaker, a telephony voice on the mobile phone is not interrupted.

For example, the first audio is an audio of a social application installed on the electronic device, and the audio of the social application includes a voice message. The second audio is an audio of a multimedia application installed on the electronic device.

It is considered that in a possible scenario in actual application, before the electronic device obtains the to-be-played audio, the electronic device has instructed the external audio device to play an audio. For example, after the electronic device establishes the connection to the external audio device, the electronic device sends a first audio to the external audio device, so that the external audio device plays the first audio. In a process of playing the first audio by the external audio device, there is a new to-be-played audio (which is described as a second audio below). In this case, a processing procedure in this embodiment of this application is as follows: The external audio device continues to play the first audio, and the electronic device plays the second audio at the same time when the external audio device plays the first audio. Optionally, in this step, the electronic device may alternatively send the second audio to the external audio device when the electronic device determines that the second audio is associated with the electronic device.

Therefore, in another implementation of the method, after the electronic device establishes the connection to the external audio device, the electronic device sends the first audio to the external audio device over the connection, so that the external audio device plays the first audio. In a process of playing the first audio by the electronic device, the electronic device obtains the to-be-played audio (which is described as the second audio herein), and the electronic device plays the second audio at the same time when the external audio device plays the first audio.

For example, the first audio is an audio of a first multimedia application installed on the electronic device. The second audio is an audio of a second multimedia application installed on the electronic device.

For example, the first audio is an audio of a multimedia application installed on the electronic device. The second audio is a telephony audio, and the telephony audio includes an incoming call prompt ringtone, a prompt tone before a call is connected when the call is made, and a voice message in a voice call process after a voice call is established.

For example, the mobile phone is connected to a Bluetooth speaker. When music on the mobile phone is played by using the Bluetooth speaker, there is a new incoming call on the mobile phone, a ringtone of the new incoming call is played by using the mobile phone, and the user can answer the new incoming call by using the mobile phone. In the entire process, the music played by using the Bluetooth speaker is not interrupted when there is the new incoming call on the mobile phone.

For another example, the mobile phone is connected to a Bluetooth speaker. When music on the mobile phone is played by using the Bluetooth speaker, there is a new WeChat voice message on the mobile phone, and the voice message can be played by using the mobile phone. In the entire process, the music played by using the Bluetooth speaker is not interrupted when the WeChat voice message is played on the mobile phone, and the WeChat voice message and the music are played by using different devices and are not mixed.

For example, the first audio is an audio of a multimedia application installed on the electronic device. The second audio is an audio of a social application installed on the electronic device, and the audio of the social application includes a voice message.

In this embodiment of this application, which device is associated with the to-be-played audio may be determined by using the following method.

Optionally, the to-be-played audio is a to-be-played audio of a first application installed on the electronic device. That the to-be-played audio is associated with the electronic device includes: The first application is any one of first-type applications. Correspondingly, that the to-be-played audio is associated with the external audio device includes: The first application is any one of second-type applications.

The first-type applications and the second-type applications are two types of applications preset by a user. For example, based on a requirement of the user, the user sets some applications that are related to privacy and that are installed on the electronic device to the first-type applications, and sets some applications that are not related to privacy and that are installed on the electronic device to the second-type applications. Alternatively, the first-type applications and the second-type applications are two types of applications set by the electronic device based on application attributes. For example, the electronic device automatically sets, based on a result such as big data analysis, applications installed on the electronic device to privacy applications and non-privacy applications.

In this implementation, for a to-be-played audio, after an application is pre-classified, the electronic device can automatically determine which device is used to play the to-be-played audio. In a scenario in which the mobile phone is connected to the large-screen device, after the method in this embodiment of this application is used, an audio of a multimedia application is set to be associated with the large-screen device, and an audio of a social application is set to be associated with the mobile phone. The mobile phone can play the audio of the multimedia application by using a speaker of the large-screen device, and play an audio of an application related to user privacy, for example, a WeChat voice message, by using the mobile phone. This helps protect the user privacy.

For example, the first-type applications are privacy applications, and the second-type applications are non-privacy applications. In specific implementation, the electronic device pre-classifies all installed applications into privacy applications and non-privacy applications. In an implementation, the electronic device automatically classifies, according to a method such as big data statistics collection, application programs installed on the electronic device into privacy applications and non-privacy applications. For example, an audio/video application such as Tencent video, iQIYI video, or Youku video, an alarm application, an office application, and a shopping application are classified into non-privacy applications. A game application, a social application, a telephony application, and a payment application are classified into privacy applications. In another implementation, the user performs setting in a setting option of the electronic device, to classify some applications into privacy applications and classify other applications into non-privacy applications based on a requirement.

In the foregoing implementation, application programs installed on the electronic device are classified into privacy applications and non-privacy applications. When the electronic device determines that the to-be-played audio is from a privacy application, the electronic device determines that the device associated with the to-be-played audio is the electronic device, and plays the to-be-played audio by using the audio device of the electronic device. When the electronic device determines that the to-be-played audio is from a non-privacy application, the electronic device determines that the device associated with the to-be-played audio is the external audio device, and plays the to-be-played audio by using the audio device of the external audio device.

Figure 5A:
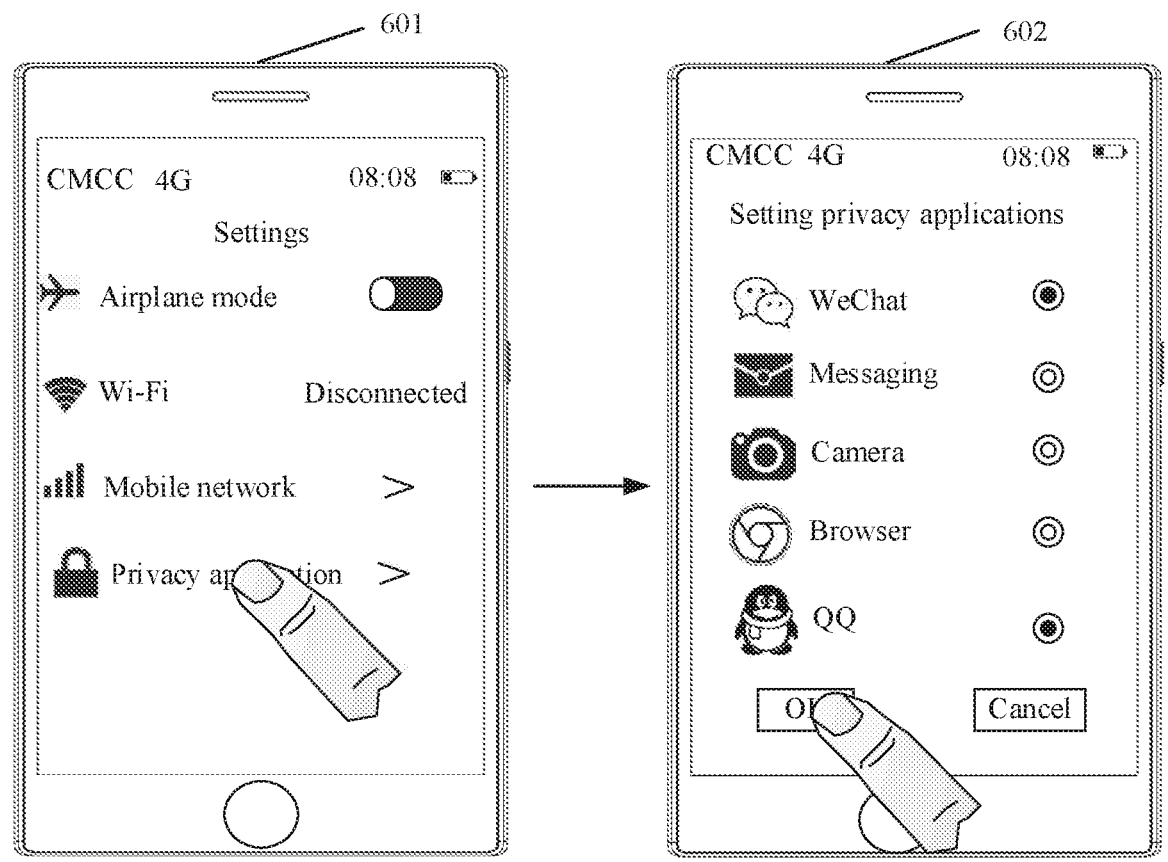
FIG. 5a to FIG. 5c each are a schematic diagram of an interface for setting a privacy application by a user.

Referring to FIG. 5a, the user opens a setting interface 601 of the mobile phone. The interface displays a setting operation that can be performed by the user on the mobile phone, and includes options such as whether to enable an airplane mode, establish a Wi-Fi connection, select a mobile network type, and set a privacy application. When the user selects the option of "setting a privacy application" in the interface 601, the mobile phone displays an interface 602. The interface 602 displays all application programs installed on the mobile phone, and the user may set some of the application programs to privacy applications based on a requirement of the user. In FIG. 5a, an example in which the user sets "WeChat" and "QQ" to privacy applications is used for description.

Figure 5B:
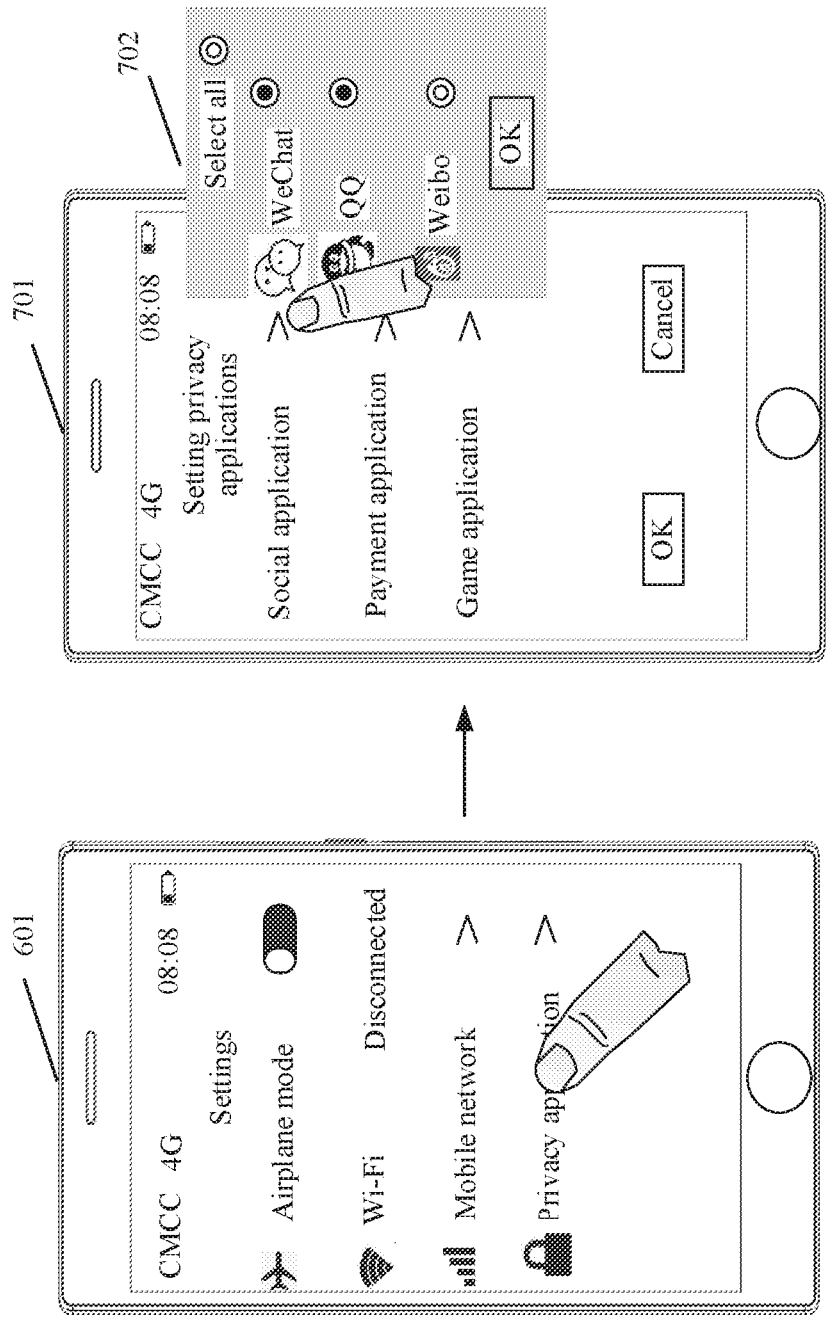

Referring to FIG. 5b, in another implementation, to help the user search for an application program, the user opens a setting interface 601 of the mobile phone, and the interface 601 displays a setting operation that can be performed by the user on the mobile phone, and includes options such as whether to enable an airplane mode, establish a Wi-Fi connection, select a mobile network type, and set a privacy application. When the user selects the option of "setting a privacy application" in the interface 601, the mobile phone displays an interface 701. The mobile phone displays, in the user interface 701, various types of applications installed on the mobile phone, including a "social application", a "payment application", and a "game application". The user may successively set all types of applications that need to be set to privacy applications. For example, the user taps an option on the right side of the "social application", and the mobile phone loads an interface 702. The interface 702 displays all social applications installed on the mobile phone. The user may select all the social applications to set all the social applications to privacy applications, or may select only some of all the social applications. In FIG. 5b, for example, the user selects "WeChat" and "QQ". When the user taps "OK", the interface 702 disappears, and the mobile phone returns to the interface 701. In this case, the user may select, from another type of applications, an application that needs to be set to a privacy application After the user taps an "OK" operation in the interface 701, setting of the privacy application is completed.

Figure 5C:
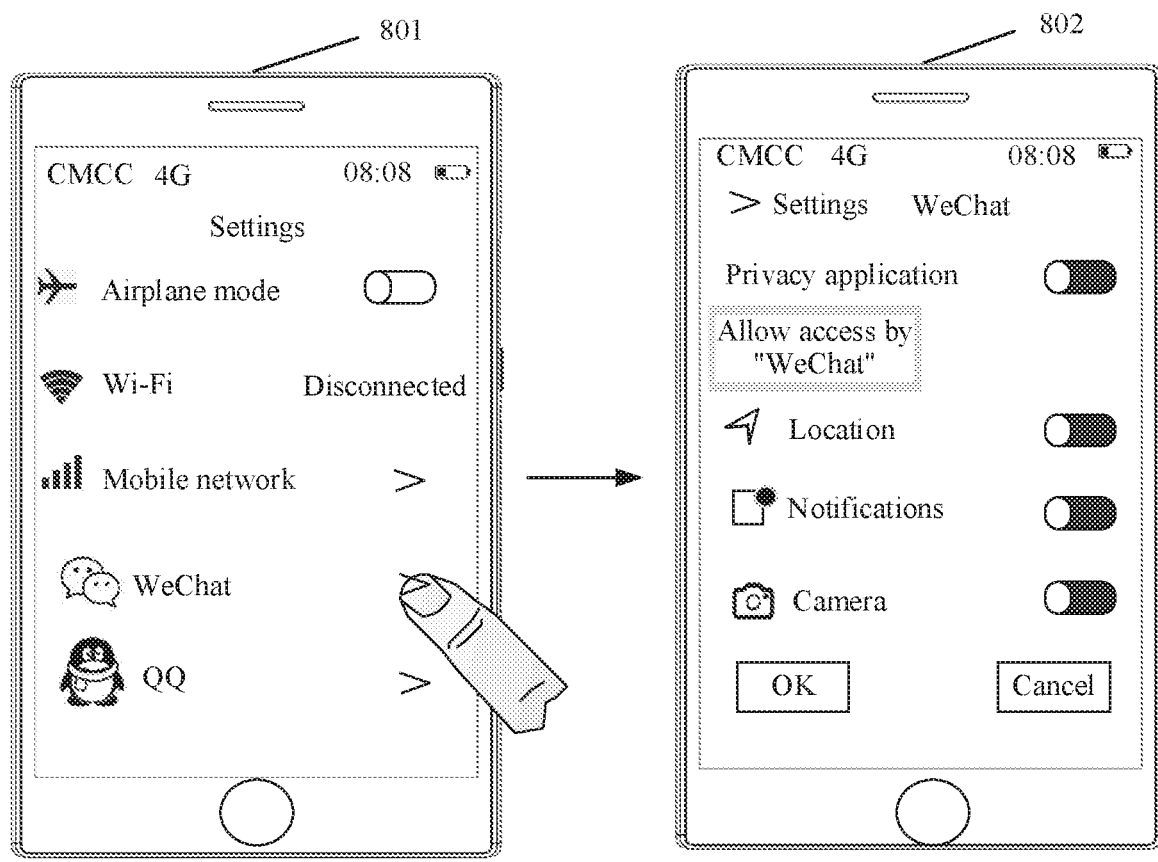

Referring to FIG. 5c, in another implementation, icons of all application programs installed on the mobile phone are successively displayed in a setting interface 801 of the mobile phone. The user may tap the right side of an icon of an application program, to display an option of an operation that can be performed on the application program. The option includes a setting operation that can be performed by the user on the application program. "WeChat" is used as an example. When the user taps the right side of "WeChat", an interface 802 is displayed. The interface 802 displays a setting operation that can be performed by the user on "WeChat", and includes an option about whether to set "WeChat" to a privacy application. In this option, the user may set "WeChat" to a privacy application.

Figures 2, 6A:
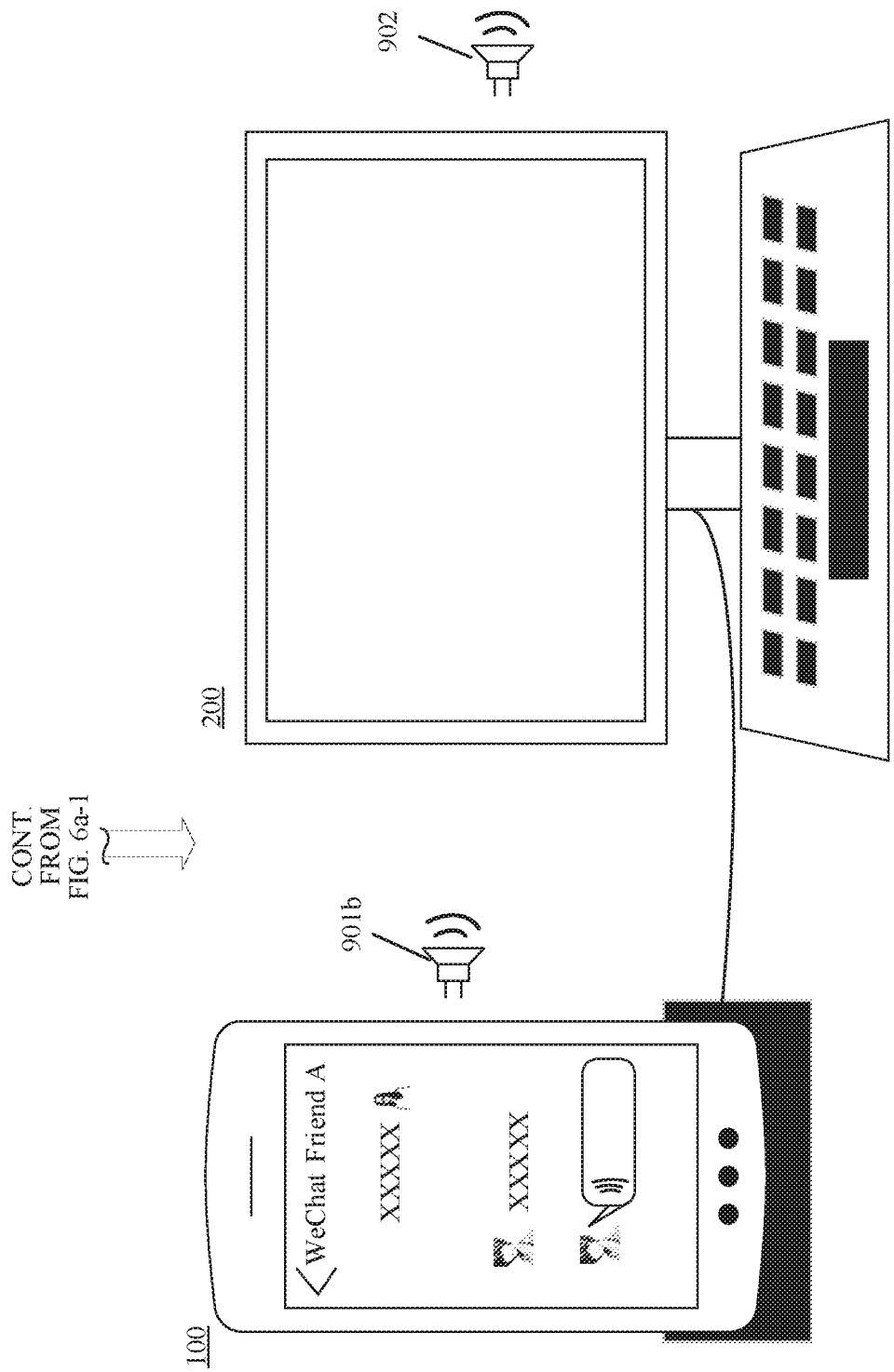
Figure 6B:
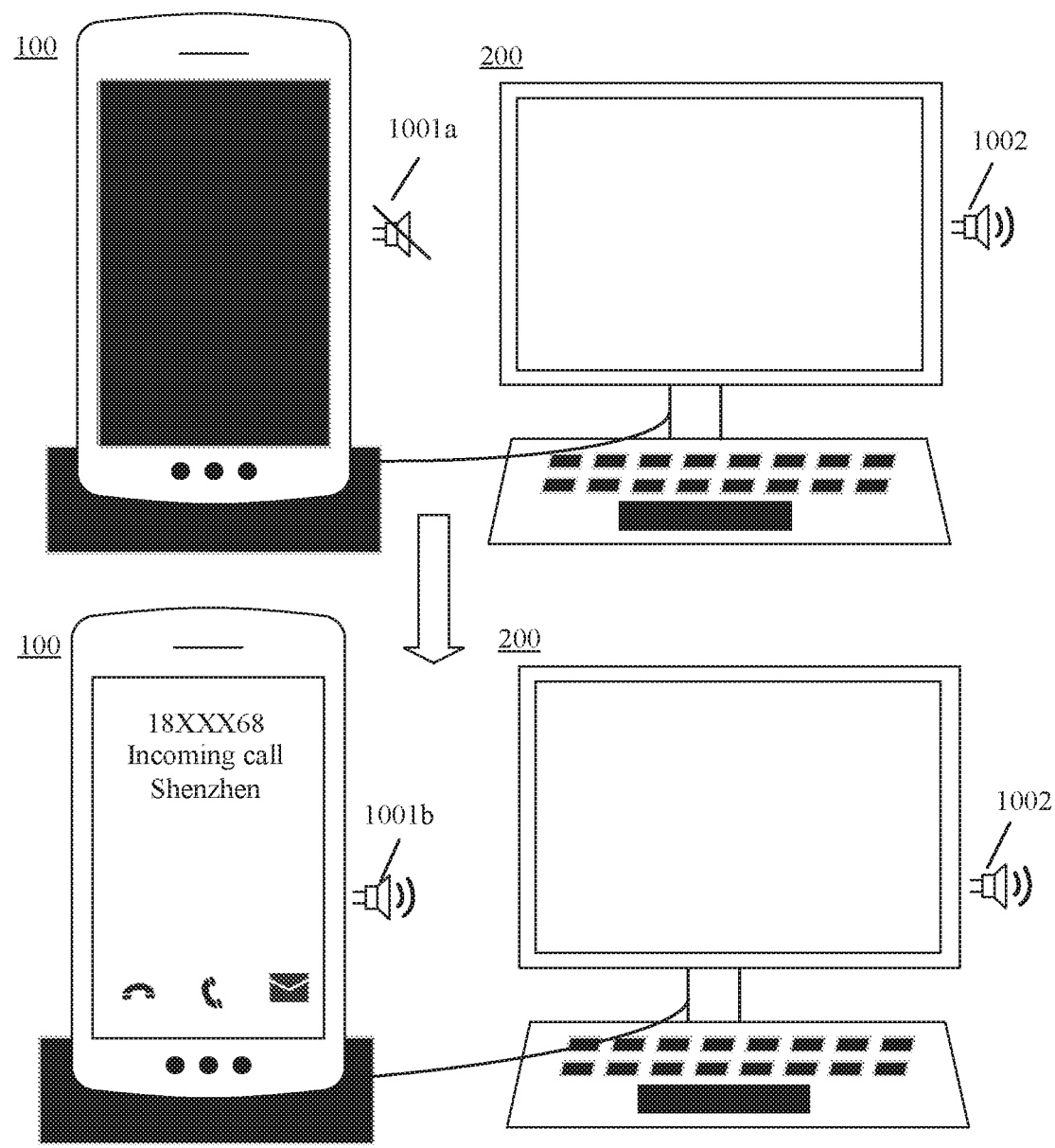
FIG. 6b is a schematic diagram of an application scenario of playing an incoming call by using an audio playing method according to an embodiment of this application.
Figures 1, 6C:
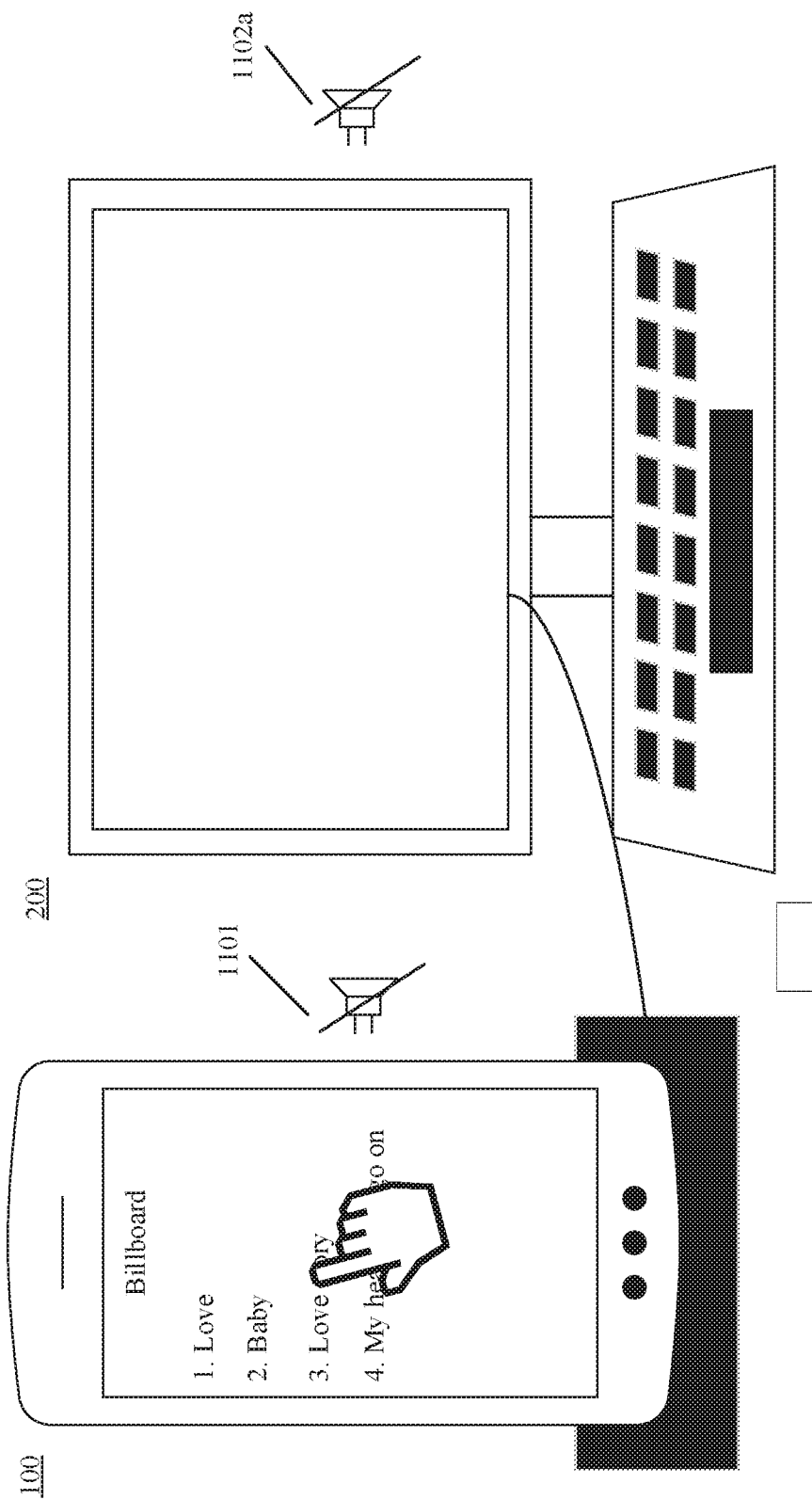
Figures 2, 6C:
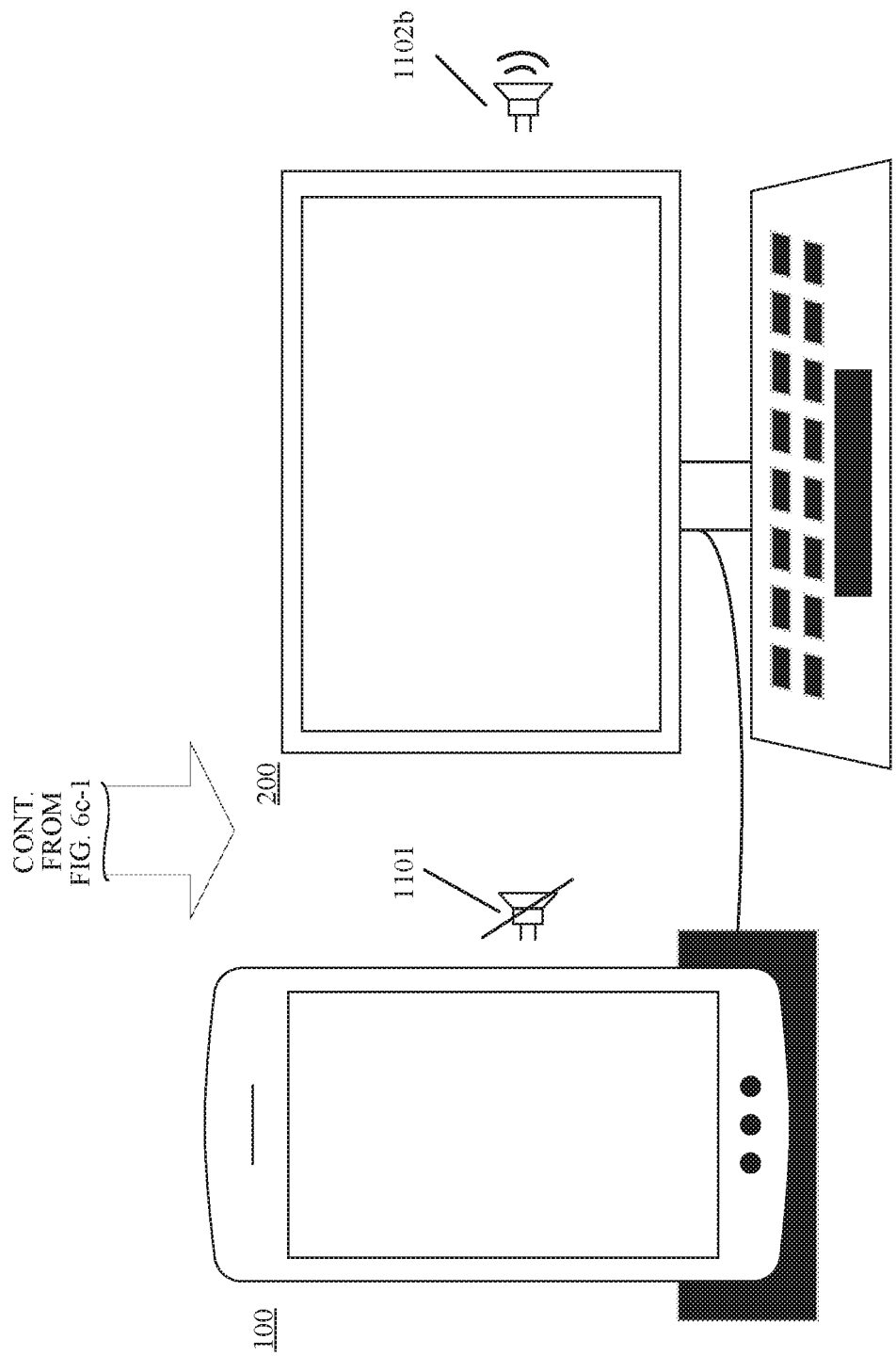

Referring to FIG. 6a-1 and FIG. 6a-2, as shown by 902, the large-screen device connected to the mobile phone is playing a multimedia file on the mobile phone. In this case, as shown by 901a, the mobile phone does not play any audio, and there is an unread voice message from the WeChat application on the mobile phone. If the user wants to play the voice message from WeChat, as shown by 901b, the mobile phone plays the voice message. At the same time, as shown by 902, the large-screen device does not pause an audio/a video that is being played, but continues to play the audio/the video. In this scenario, in a process of playing the audio/the video by the large-screen device, there is a new to-be-played audio, and the new to-be-played audio is a to-be-played audio from a privacy application. In this case, the to-be-played audio is played by using the mobile phone. In addition, the large-screen device continues to play the audio that is currently being played, at the same time when the mobile phone plays the to-be-played audio. In this way, when playing of the audio/the video by the large-screen device is not affected, an audio of a privacy application is played by using the mobile phone. This helps protect user privacy.

Referring to FIG. 6b, as shown by 1001a, the mobile phone is in a screen-locked state and does not play any audio. As shown by 1002, the large-screen device connected to the mobile phone is playing a multimedia file on the mobile phone. As shown by 1001b, when there is a new incoming call on the mobile phone, the mobile phone plays a ringtone of the incoming call; and the user can answer the call by using the mobile phone, and play a voice message in a call process. At the same time, as shown by 1002, the large-screen device connected to the mobile phone still continues to play a previous audio/video. Therefore, in this application scenario, when the external audio device connected to the mobile phone plays an audio, the mobile phone receives a new incoming call, the audio that is being played by the external audio device does not need to be paused, and the user can answer the new incoming call by using the mobile phone. In other words, the mobile phone and the external audio device play different audios at the same time. In this way, when playing of the audio by the external audio device is not affected, the user can answer the call by using the mobile phone.

Referring to FIG. 6c-1 and FIG. 6c-2, as shown by 1101, the mobile phone currently does not play any audio, and at the same time, as shown by 1102a, the large-screen device currently does not play any audio, either. When the user wants to play a song, and the mobile phone determines that the song is from a non-privacy application, as shown by 1102b, the song is played by using the large-screen device.

Optionally, the to-be-played audio is a to-be-played audio of a first application installed on the electronic device. Correspondingly, that the to-be-played audio is associated with the electronic device includes: a quantity of historical times of playing the audio of the first application by using the electronic device is greater than or equal to a first threshold. Correspondingly, that the to-be-played audio is associated with the external audio device includes: a quantity of historical times of playing the audio of the first application by using the external audio device is greater than a second threshold.

The first threshold and the second threshold may be the same or may be different.

In this implementation, based on a historical playing record of the user, when the historical playing record indicates that the user frequently uses the electronic device to play an audio of an application or audios of some applications, for a to-be-played audio from the application, the to-be-played audio is still played by using the electronic device. When the historical playing record indicates that the user frequently uses the external audio device to play an audio of an application or audios of some applications, for a to-be-played audio from the application, the audio from the application is still played by using the external audio device. Therefore, in this implementation, for a to-be-played audio, the electronic device can automatically determine which device is used to play the to-be-played audio.

Figure 7A:
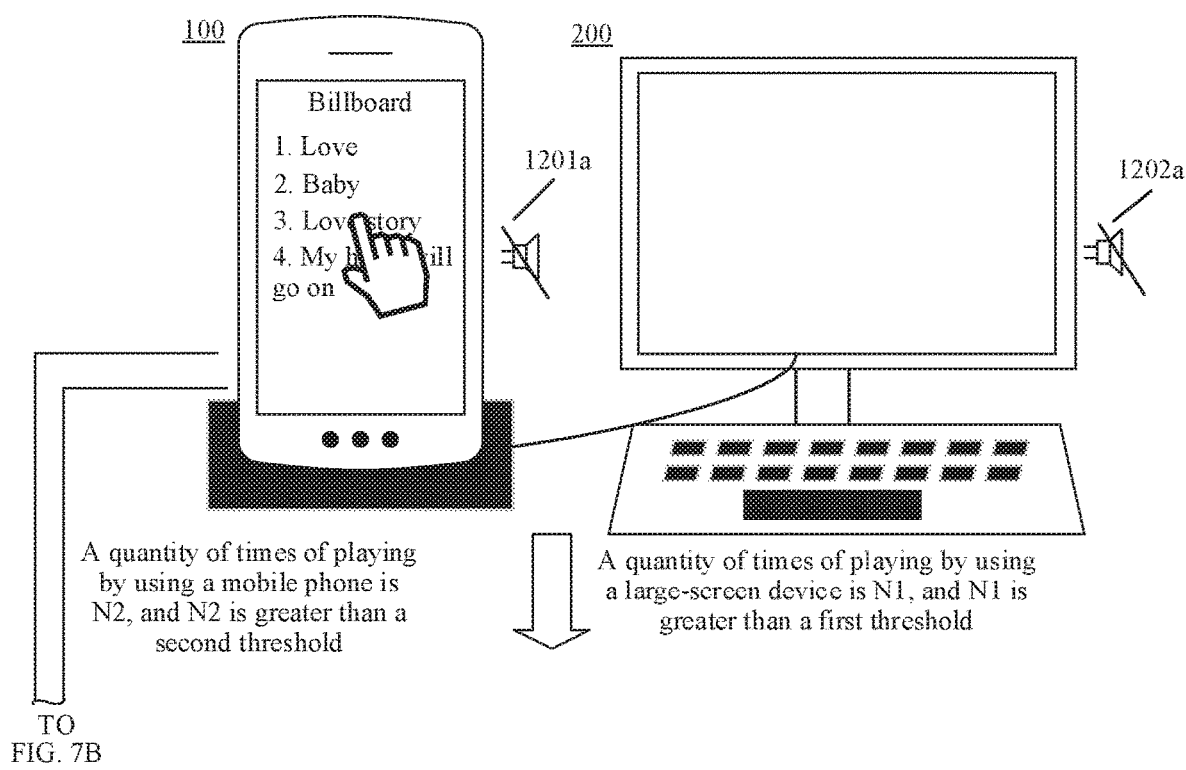
FIG. 7A and FIG. 7B are a schematic diagram of an application scenario of playing a song by using an audio playing method according to an embodiment of this application.
Figure 7B:
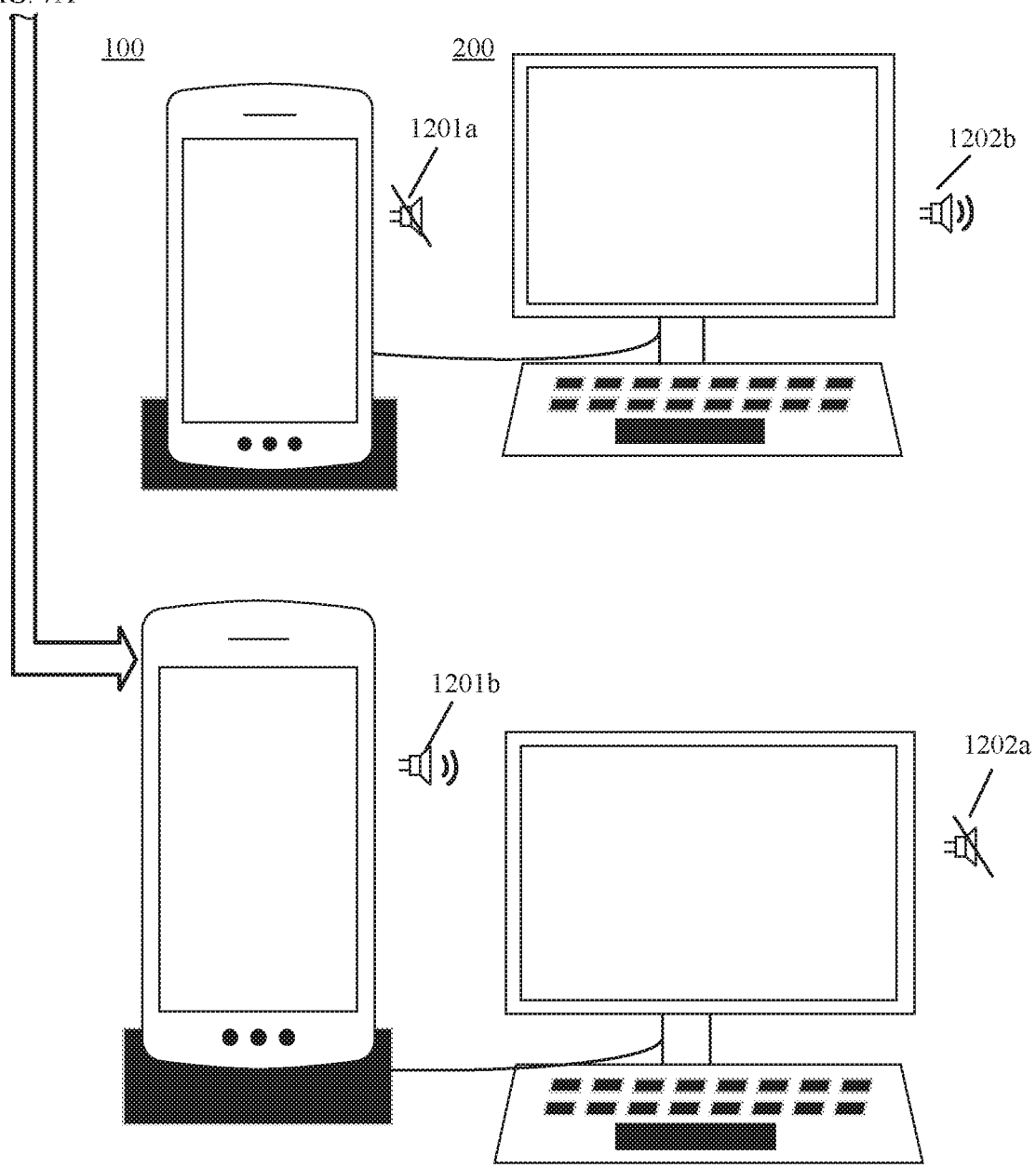

Referring to FIG. 7A and FIG. 7B, as shown by 1201*a*, the mobile phone currently does not play any audio. At the same time, as shown by 1202*a*, the large-screen device does not play any audio. When the user wants to play a song, and the mobile phone determines that a quantity of historical times of playing an audio of a first application corresponding to the song by using the mobile phone is N2 and N2 is greater than a preset threshold, as shown by 1201*b*, the mobile phone plays the song. At the same time, as shown by 1202*a*, the large-screen device still does not play any audio. If the mobile phone determines that a quantity of historical times of playing an audio of a first application corresponding to the song by using the large-screen device is N1 and N1 is greater than a preset threshold, as shown by 1202*b*, the large-screen device plays the audio. At the same time, as shown by 1201*a*, the mobile phone still does not play any audio.

Optionally, the to-be-played audio is a to-be-played audio of a first application installed on the electronic device. Correspondingly, that the to-be-played audio is associated with the electronic device includes: The electronic device currently displays an interface of the first application. Correspondingly, that the to-be-played audio is associated with the external audio device includes: The electronic device sends first display data to the external audio device, so that the external audio device currently displays the interface of the first application.

In this implementation, the to-be-played audio belongs to the first application. For the external audio device having a display function, when the interface of the first application is displayed by using the electronic device, it indicates that the user may be currently operating the first application by using the electronic device, and the to-be-played audio from the first application is played by using the electronic device. When the interface of the first application is displayed by using the external audio device, it indicates that the user may be currently operating the first application by using the external audio device, and the to-be-played audio from the first application is played by using the external audio device.

Optionally, in an implementation, that the to-be-played audio is associated with the electronic device includes: obtaining a first instruction entered by the user, where the first instruction is used to instruct to play the to-be-played audio on the electronic device. Correspondingly, that the to-be-played audio is associated with the external audio device includes: obtaining a second instruction entered by the user, where the second instruction is used to instruct to play the to-be-played audio on the external audio device.

In this implementation, a device instructed by the user is selected, according to the instruction of the user, to play the to-be-played audio.

For example, when both the electronic device and the external audio device display the interface of the first application, the electronic device detects, in the interface of the first application on which device, an operation that is triggered by the user to play the to-be-played audio. When the user triggers, in the interface of the first application displayed on the electronic device, to play the to-be-played audio, the to-be-played audio is played by using the electronic device. When the user triggers, in the interface of the first application displayed on the external audio device, to play the to-be-played audio, the to-be-played audio is played by using the external audio device.

For another example, the electronic device presents user prompt information, where the user prompt information is used to prompt the user which device is used to play the to-be-played audio. Correspondingly, according to an instruction triggered by the user for the user prompt information, the to-be-played audio is played by using a device instructed by the instruction.

In this implementation, each time before a to-be-played audio is played, the user is prompted to select a device for playing the to-be-played audio, and the to-be-played audio is played by using the device selected by the user.

After the mobile phone establishes the connection to the large-screen device, the mobile phone maps an icon of an installed application program to the large-screen device. The mobile phone and the large-screen device share an operating system, storage space, and the like of the mobile phone, and the large-screen device is equivalent to another display and audio output device of the mobile phone.

Figures 1, 8A:
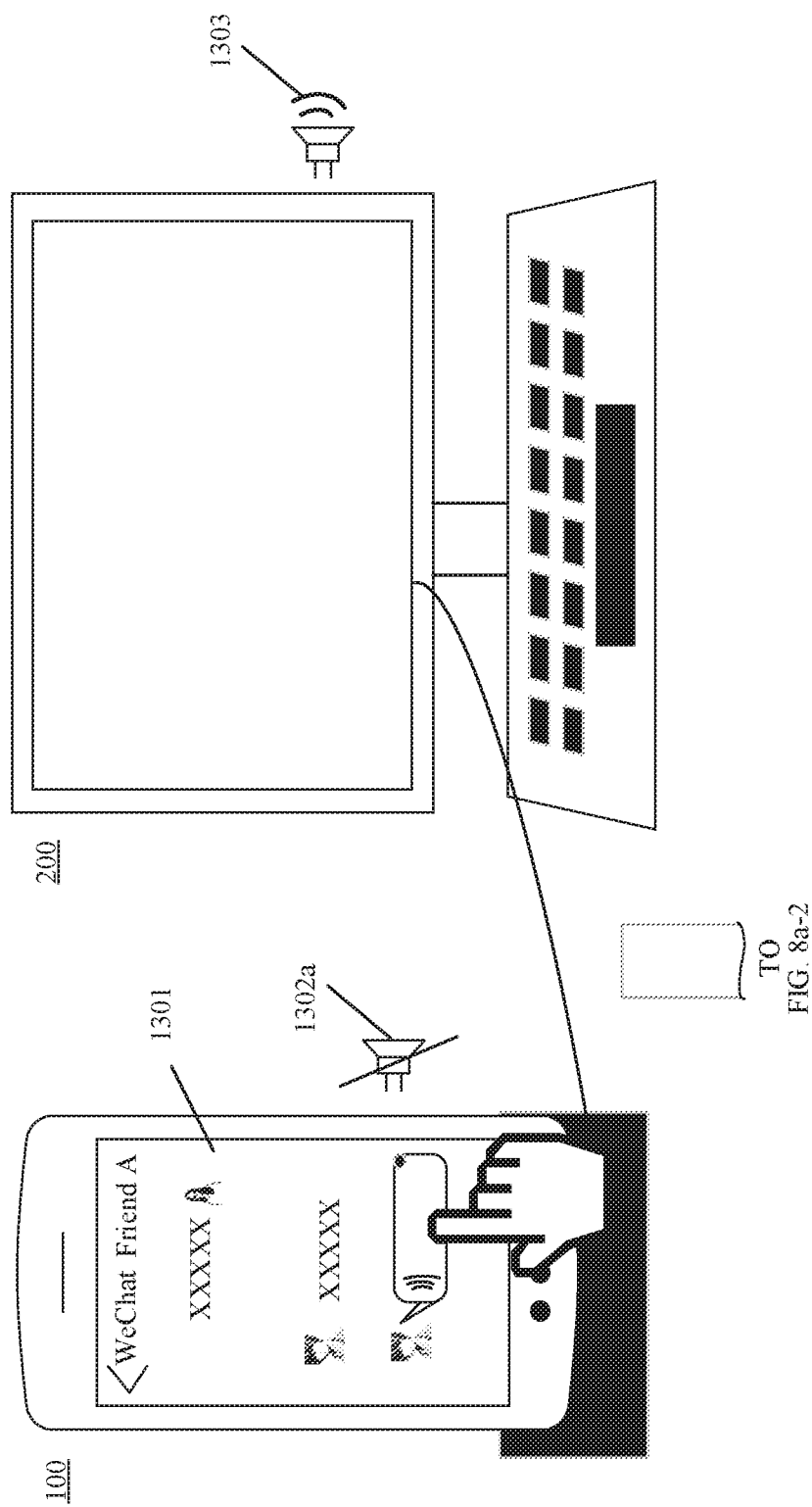
Figures 2, 8A:
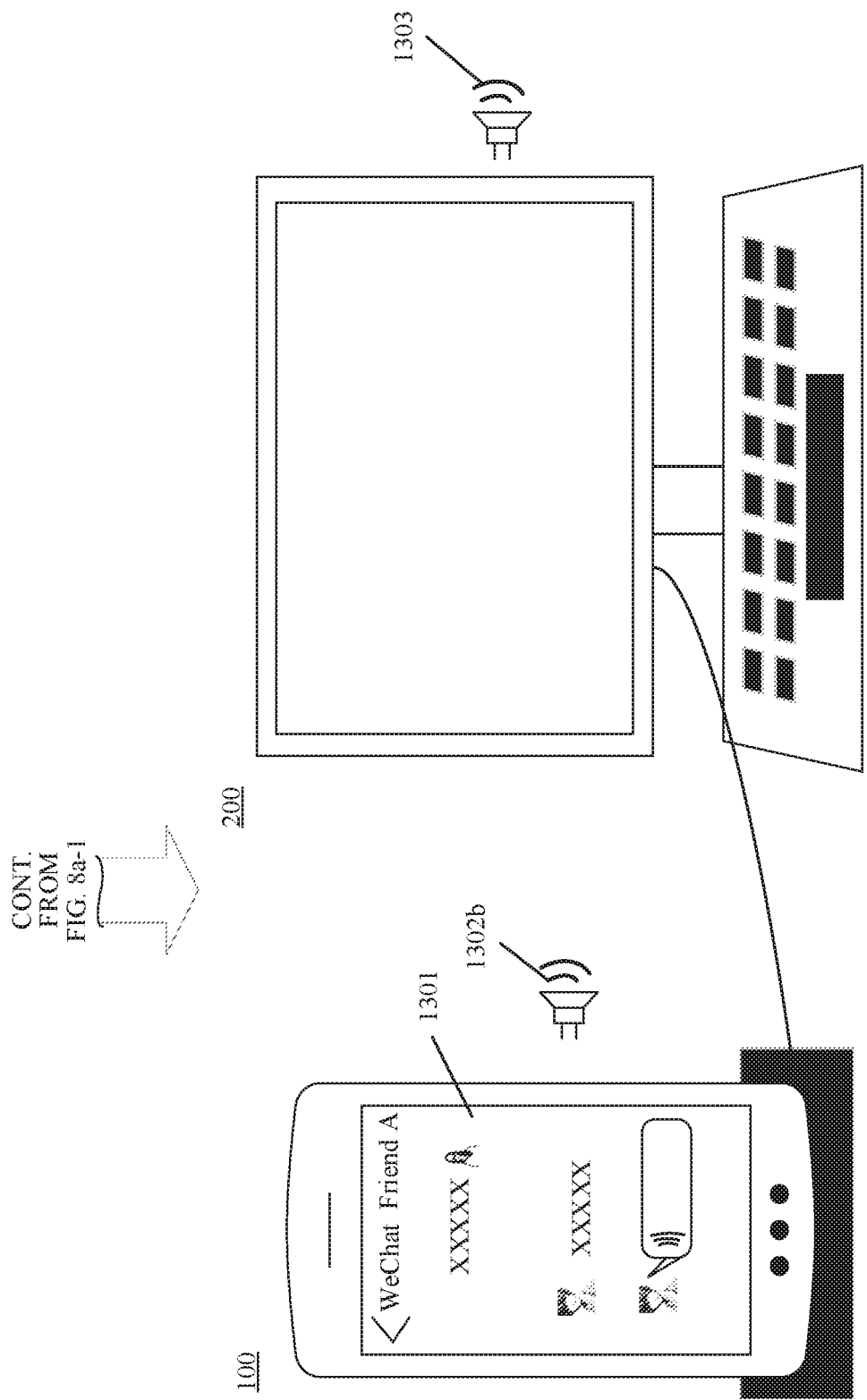

Referring to FIG. 8*a*-1 and FIG. 8*a*-2, as shown by 1301, the user opens a WeChat interface, and there is an unread voice message, as shown by 1302*a*. At the same time, as shown by 1303, the large-screen device is playing an audio. When the user triggers to play the unread voice message in 1301, and the mobile phone detects the operation performed by the user on the mobile phone, it indicates that the user wants to play the voice message by using the mobile phone. As shown by 1302*b*, the mobile phone plays the voice message. At the same time, as shown by 1303, the large-screen device still continues to play the audio that is currently being played.

Alternatively, in another implementation, when the mobile phone detects that the large-screen device is currently playing the audio, a prompt message pops up to query the user whether to play the unread voice message by using the large-screen device. If the user determines to play the unread voice message by using the large-screen device, the voice message is played by using the large-screen device. If the user determines not to play the unread voice message by using the large-screen device, the voice message is played by using the mobile phone by default or not played.

Figures 1, 8B:
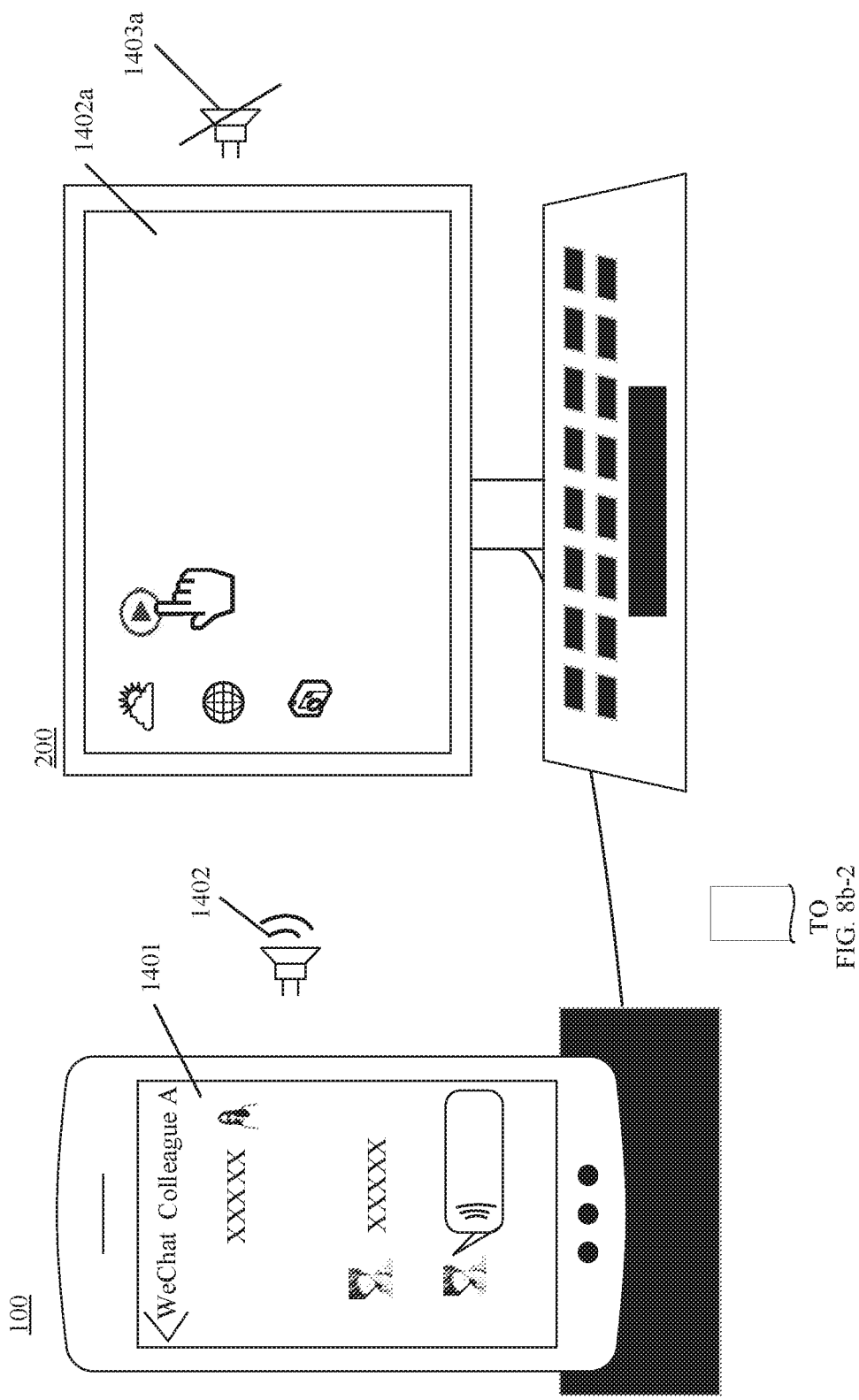
Figures 2, 8B:
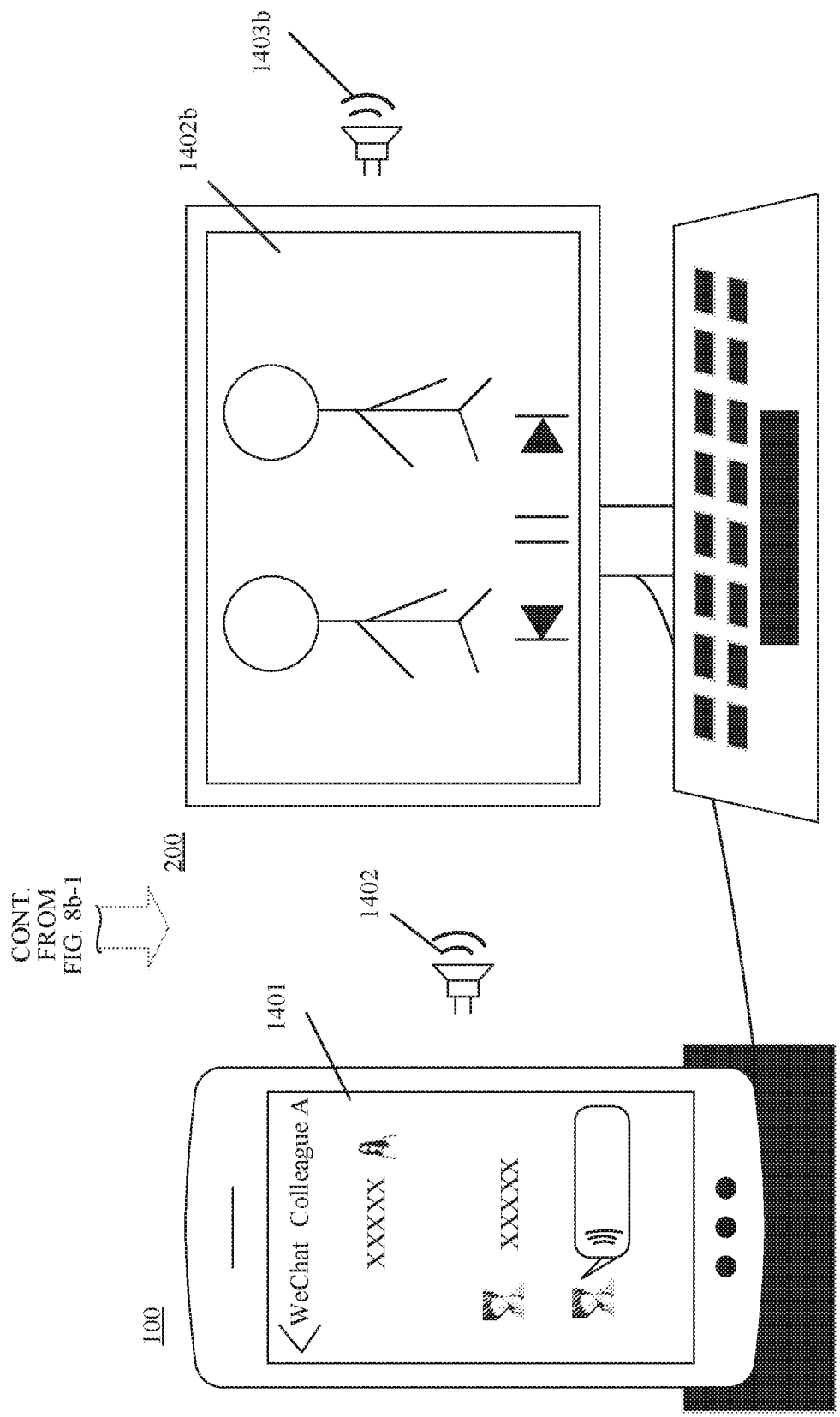

Referring to FIG. 8*b*-1 and FIG. 8*b*-2, as shown by 1401, an interface currently displayed by the mobile phone is a WeChat interface, and as shown by 1402, the mobile phone is playing a voice message from WeChat. At the same time, as shown by 1402*a*, icons of various application programs are displayed on the large-screen device, and as shown by 1403*a*, the large-screen device does not play any audio. When the mobile phone detects a trigger operation, triggered by the user in an interface 1402*a* of the large-screen device, for playing an audio, it indicates that the user wants to play an audio/a video by using the large-screen device. As shown by 1402*b*, an image is displayed on the large-screen device, and as shown by 1403*b*, the large-screen device plays the audio. At the same time, the mobile phone continues to play the voice message that is currently being played.

It is considered that the connection between the mobile phone and the large-screen device may be applied to a multi-party scenario, or may be applied to a scenario with few people. Privacy is not leaked. For example, the user may independently stay in a room or stay with a close classmate or friend. The user connects the mobile phone and the large-screen device to obtain good user experience when an audio/a video is played. In this way, privacy is not leaked. In this case, even if a to-be-played audio is from a privacy application, the user may still want to play the to-be-played audio by using the large-screen device.

Figure 9A:
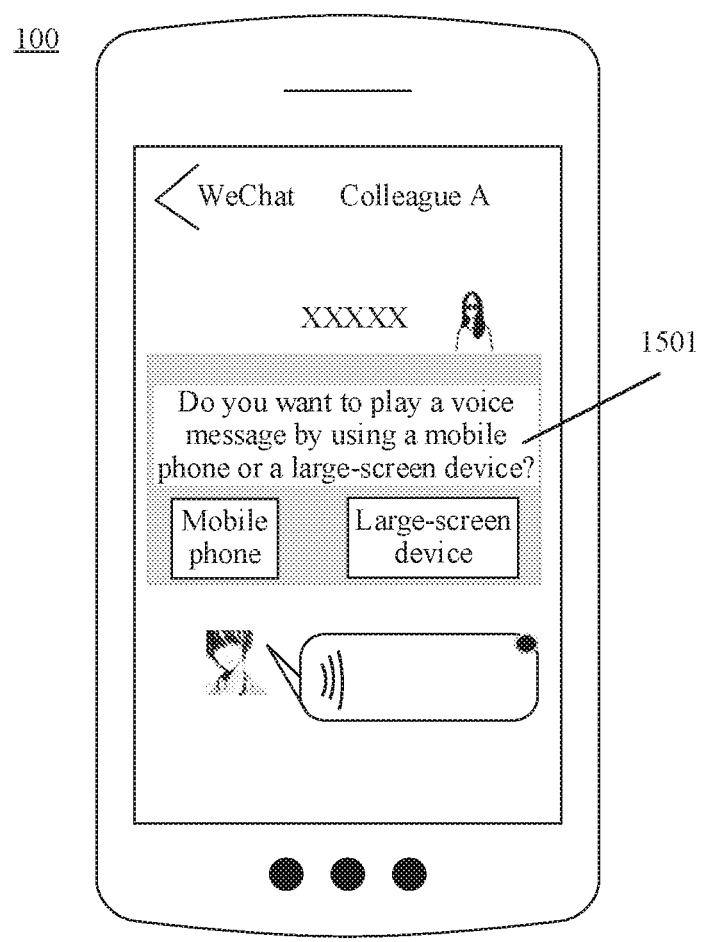
FIG. 9a is a schematic diagram of an application scenario in which when there is a to-be-played audio, a user is prompted, by using an audio playing method, which device is used to play the to-be-played audio according to an embodiment of this application.

For example, referring to FIG. 9a, when the mobile phone displays an unread voice message in a WeChat interface, the mobile phone displays an interface 1501. The interface 1501 displays a query message for querying whether the user wants to play the voice message by using the mobile phone or the large-screen device. When the user instructs to play the voice message by using the mobile phone, the voice message is played by using the mobile phone. When the user instructs to play the voice message by using the large-screen device, the voice message is played by using the large-screen device.

Figure 9B:
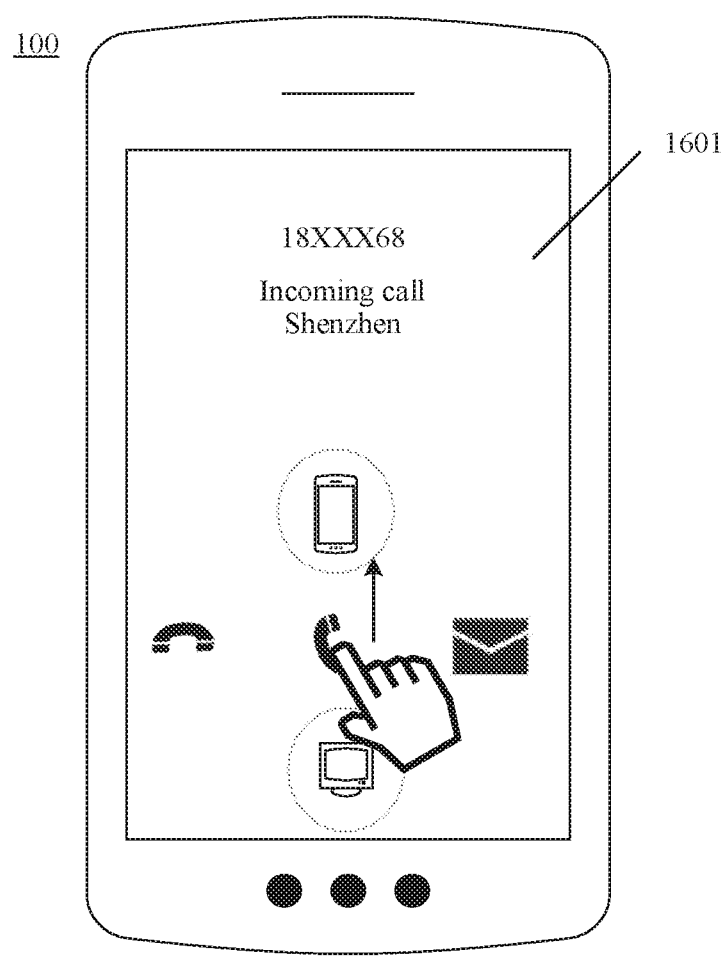
FIG. 9b is a schematic diagram of an application scenario in which when there is a new incoming call, a user is prompted, by using an audio playing method, which device is used to answer the call according to an embodiment of this application.

For example, referring to FIG. 9b, when the mobile phone detects that the user answers a new incoming call, the mobile phone displays an interface 1601. Icons of the mobile phone and the large-screen device are displayed in the interface 1601, to query whether the user wants to answer the call by using the large-screen device or the mobile phone. When the user instructs to answer the call by using the mobile phone, a voice signal is played by using the mobile phone. When the user instructs to answer the call by using the large-screen device, the voice signal is played by using the large-screen device.

The foregoing mainly describes the solutions provided in the embodiments of this application from a perspective of interaction between network elements. It may be understood that, to implement the foregoing functions, each network element, such as the electronic device, includes a corresponding hardware structure and/or software module for performing each function. A person skilled in the art should easily be aware that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules in the electronic device may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that the module division in the embodiments of this application is an example, and is merely logical function division. There may be another division manner in actual implementation.

Figure 10:
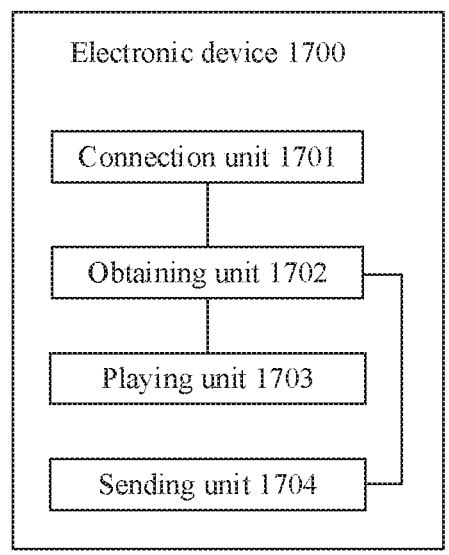
FIG. 10 is a schematic structural diagram of an electronic device according to an embodiment of this application.

When each functional module is obtained through division based on each corresponding function, FIG. 10 is a possible schematic structural diagram of the electronic device in the foregoing embodiment. An electronic device 1700 includes a connection unit 1701, an obtaining unit 1702, a playing unit 1703, and a sending unit 1704. The connection unit 1701 is configured to establish a connection between the electronic device and an external audio device. The obtaining unit 1702 is configured to obtain a to-be-played audio. The playing unit 1703 is configured to play the to-be-played audio when the to-be-played audio obtained by the obtaining unit 1702 is associated with the electronic device. The sending unit 1704 is configured to: when the to-be-played audio obtained by the obtaining unit 1702 is associated with the external audio device, send the to-be-played audio to the external audio device over the established connection, so that the external audio device plays the to-be-played audio.

All related content of each step in the foregoing method embodiments may be cited in function descriptions of a corresponding functional module in content of the present invention. Details are not described herein.

Figure 10A:
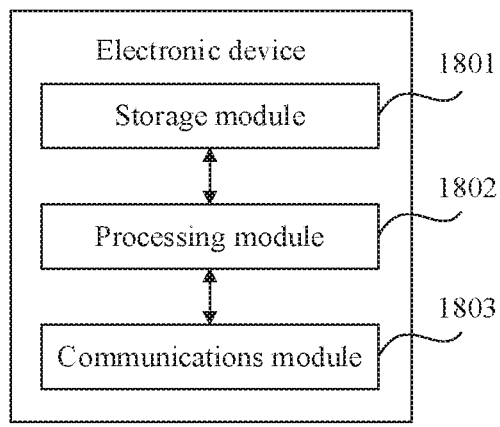
FIG. 10a is another schematic structural diagram of an electronic device according to an embodiment of this application.

When an integrated unit is used, FIG. 10A shows a possible schematic structural diagram of the electronic device in the foregoing embodiment. An electronic device 1800 includes a processing module 1802 and a communications module 1803. The processing module 1802 is configured to control and manage an action of the electronic device. For example, the processing module 1802 is configured to support the electronic device in performing the process 402 and the process 404 in FIG. 3, and/or is configured to perform another process of the technology described in this specification. The communications module 1803 is configured to support the electronic device in communicating with another network entity, for example, communicating with the external audio device shown in FIG. 1a or FIG. 1b. The electronic device may further include a storage module 1801, configured to store program code and data of a base station.

The processing module 1802 may be a processor or a controller, for example, may be a central processing unit (Central Processing Unit, CPU), a general-purpose processor, a digital signal processor (Digital Signal Processing, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. The processing module 1802 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1803 may be a transceiver, a transceiver circuit, a communications interface, or the like. The storage module 1801 may be a memory.

Figure 10B:
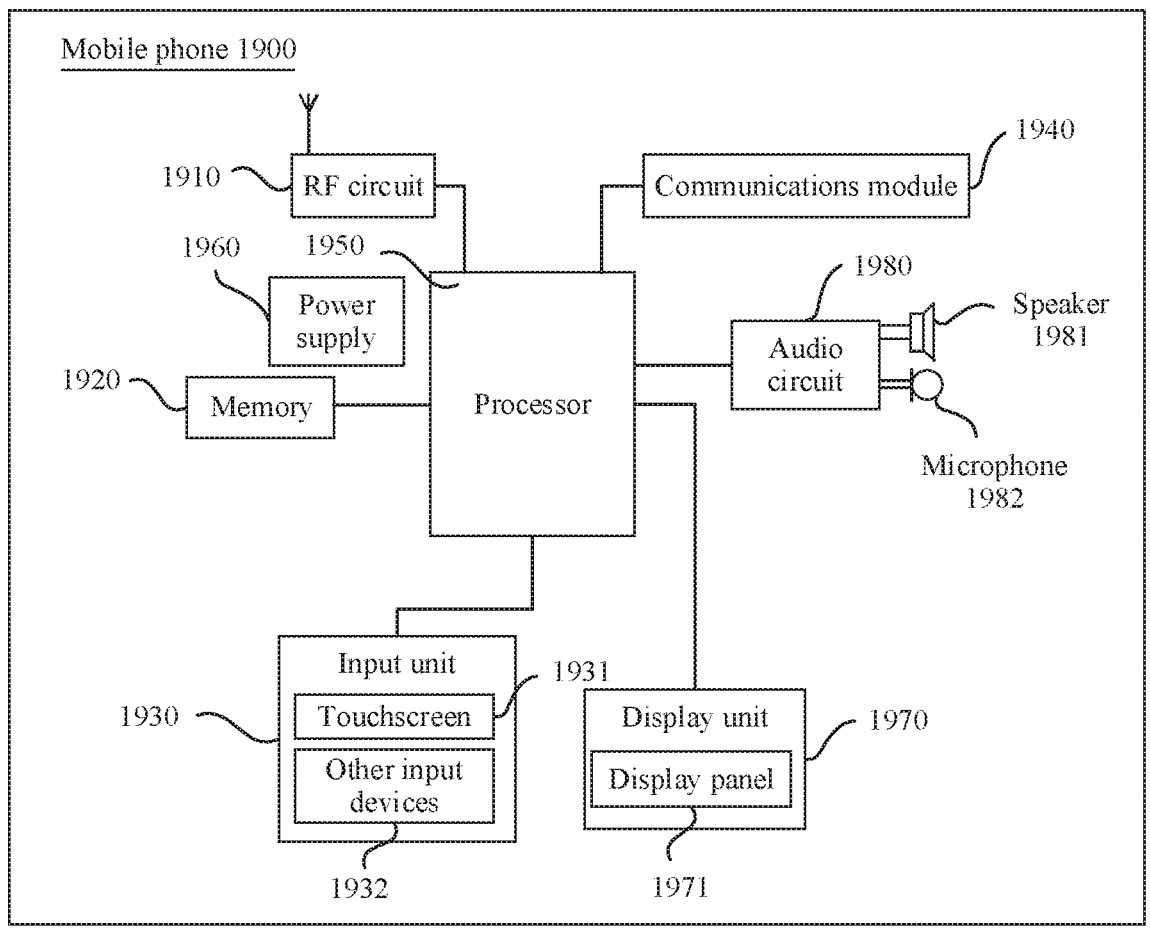
FIG. 10b is still another schematic structural diagram of an electronic device according to an embodiment of this application.

Referring to FIG. 10b, an embodiment of this application further provides an electronic device 1900, configured to perform the foregoing method. The electronic device 1900 includes components such as a radio frequency (radio frequency, RF) circuit 1910, a memory 1920, an input unit 1930, a communications module 1940, a processor 1950, a power supply 1960, a display unit 1970, and an audio circuit 1980. A person skilled in the art may understand that a structure of the mobile phone shown in FIG. 10b constitutes no limitation on the mobile phone. The mobile phone may include more or fewer components than those shown in the figure, may combine some components, or may have different component arrangements.

The following separately describes functional components of the electronic device 1900.

The RF circuit 1910 may be configured to receive and send information, or receive and send a signal in a call process. In particular, after receiving downlink information from a base station, the RF circuit 1910 sends the downlink information to the processor 1950 for processing. In addition, the RF circuit 1910 sends uplink data to the base station. The RF circuit usually includes but is not limited to an antenna, at least one amplifier, a transceiver, a coupler, a low noise amplifier (low noise amplifier, LNA), a duplexer, and the like. In addition, the RF circuit 1910 may further communicate with a network and another device through wireless communication provided by the communications module 1940. The wireless communication may use any communications standard or protocol, including but is not limited to a global system for mobile communications (global system for mobile communications, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short message service (short messaging service, SMS), and the like.

The memory 1920 may be configured to store a software program and a module, and the processor 1950 performs various function applications of the electronic device 1900 and data processing by running the software program and the module that are stored in the memory 1920. The memory 1920 may mainly include a program storage area and a data storage area. The program storage area may store an operating system, an application program (Application, APP) required by at least one function such as a voice playing function or an image playing function. The data storage area may store data (such as audio data, image data, and an address book) that is created based on use of the electronic device 1900, and the like, in addition, the memory 1920 may include a high speed random access memory, or may include a nonvolatile memory, for example, at least one magnetic disk storage device, a flash memory device, or another volatile solid-state storage device.

The input unit 1930 may be configured to: receive entered number or Character information, and generate key signal input related to a user setting and function control of the electronic device 1900. Specifically, the input unit 1930 may include a touchscreen 1931 and other input devices 1932. The touchscreen 1931 is also referred to as a touch panel, and may collect a touch operation (for example, an operation performed by a user on or near the touchscreen 1931 by using any proper object or accessory such as a finger or a stylus) performed by the user on or near the touchscreen 1931, and drive a corresponding connection apparatus by using a preset program. Optionally, the touchscreen 1931 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information into touch coordinates, then sends the touch coordinates to the processor 1950, and can receive and execute a command sent by the processor 1950. In addition, the touchscreen 1931 may be implemented in various types such as a resistive type, a capacitive type, an infrared type, and a surface acoustic wave type. In addition to the touchscreen 1931, the input unit 1930 may further include the other input devices 1932. Specifically, the other input devices 1932 may include but are not limited to one or more of a physical keyboard, a function key (such as a volume control key or a power on/off key), a trackball, a mouse, a joystick, and the like.

The display unit 1970 may be configured to display information entered by the user or information provided for the user, and various menus of the electronic device 1900. The display unit 1970 may include a display panel 1971. Optionally, the display panel 1971 may be configured in a form of a liquid crystal display (Liquid. Crystal Display, LCD), an organic light-emitting diode (Organic Light-Emitting Diode, OLED), or the like. Further, the touchscreen 1931 may cover the display panel 1971. After detecting a touch operation on or near the touchscreen 1931, the touchscreen 131 transfers the touch operation to the processor 1950 to determine a type of a touch event. Then the processor 1950 provides a corresponding visual output on the display panel 1971 based on the type of the touch event. Although in FIG. 10b, the touchscreen 1931 and the display panel 1971 are used as two independent components to implement input and output functions of the electronic device 1900, in some embodiments, the touchscreen 1931 and the display panel 1971 may be integrated to implement the input and output functions of the electronic device 1900.

The audio circuit 1980, a speaker 1981, and a microphone 1982 may provide audio interfaces between the user and the electronic device 1900. The audio circuit 1980 may transmit, to the speaker 1981, an electrical signal converted from received audio data, and the speaker 1981 converts the electrical signal into a sound signal for outputting. In another aspect, the microphone 1982 converts a collected sound signal into an electrical signal, and the audio circuit 1980 converts the electrical signal into audio data after receiving the electrical signal, and then outputs the audio data to the RF circuit 1910 to send the audio data to, for example, another mobile phone, or outputs the audio data to the memory 1920 for further processing.

The processor 1950 is a control center of the electronic device 1900, is connected to all parts of the entire mobile phone through various interfaces and lines, and executes, by running or executing the software program and/or the module stored in the memory 1920 and by invoking data stored in the memory 1920, various functions of the electronic device 1900 and data processing, to perform overall monitoring on the mobile phone. Optionally, the processor 1950 may include one or more processing units. Optionally, the processor 1950 may integrate an application processor and a modem processor. The application processor mainly processes an operating system, a user interface, an application program, or the like. The modem processor mainly processes wireless communication. It may be understood that the modem processor may alternatively not be integrated into the processor 1950.

The electronic device 1900 further includes the power supply 1960 (for example, a battery) that supplies power to each component. Preferably, the power supply may be logically connected to the processor 1950 by using a power management system, so as to implement a function such as charging, discharging, and power consumption management by using the power management system.

Although not shown, the electronic device 1900 further includes sensors such as a gravity sensor (gravity sensor), an optical sensor, and an infrared sensor. Specifically, the gravity sensor may detect an acceleration value of the mobile phone in each direction (there are usually three axes), and detect a value and a direction of gravity in a static mode, and may be applied to an application that recognizes a posture of the mobile phone (for example, switching between landscape orientation and portrait orientation, a related game, or magnetometer posture calibration), a function related to vibration recognition (such as a pedometer or a knock), and the like. The optical sensor may include an ambient light sensor and an optical proximity sensor. The ambient light sensor may adjust luminance of the display panel 1931 based on brightness of ambient light. The optical proximity sensor may detect whether an object approaches or touches the mobile phone, and may turn off and/or backlight the display panel 1931 when the electronic device 1900 moves to an ear. In addition, the electronic device 1900 may be further configured with an antenna, a Wi-Fi module, a near field communication (near field communication, NFC) unit, a Bluetooth module, a speaker, an accelerometer, a gyroscope, a barometer, a hygrometer, and a thermometer. The electronic device 1900 may be further configured with a sensor configured to implement biometric recognition, such as a fingerprint recognition sensor or an iris recognition sensor. Details are not described herein.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, some or all of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium, for example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a DVD), a semiconductor medium (for example, a solid state disk Solid State Disk, (SSD)), or the like.

The objectives, technical solutions, and benefit effects of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

What is claimed is:

1. A method, comprising:
   establishing a BLUETOOTH coupling to an external audio device;
   playing first audio associated with a first application using a first speaker of an electronic device;
   displaying, through a display of the electronic device, a settings interface for the electronic device;
   receiving, through the settings interface and from a user, a privacy setting for the electronic device;
   obtaining second audio associated with a second application while playing the first audio using the first speaker of the electronic device, wherein the first application and the second application comprise different applications, wherein a first application type of the first application is a privacy application, and wherein a second application type of the second application is a non-privacy application; and
   simultaneously continuing to play, based on the first application type of the first application being the privacy application and based on the privacy setting for the electronic device, the first audio using the first speaker of the electronic device and sending, based on the second application type of the second application being the non-privacy application, the second audio to the external audio device through the BLUETOOTH coupling to enable the external audio device to play the second audio using a second speaker of the external audio device instead of the electronic device playing the second audio while the electronic device continues to play the first audio using the first speaker of the electronic device.

2. The method of claim 1, further comprising identifying, based on the second application type of the second application being the non-privacy application, that the second audio is associated with the external audio device.

3. The method of claim 1, further comprising storing associations between the first application and the first application type and between the second application and the second application type.

4. The method of claim 1, wherein a quantity of historical times of playing audio associated with the second application using the external audio device is greater than or equal to a first threshold.

5. The method of claim 1, further comprising sending display data to the external audio device to enable the external audio device to display an interface of the second application.

6. The method of claim 1, further comprising obtaining a first instruction from the user, wherein the first instruction instructs to play the second audio on the external audio device.

7. The method of claim 1, further comprising presenting user prompt information, wherein the user prompt information prompts the user to identify that the first application type of the first application is the privacy application and that the second application type of the second application is the non-privacy application.

8. The method of claim 1, wherein the first application and the second application are different multimedia applications installed on the electronic device.

9. The method of claim 1, wherein the first audio comprises telephony audio, and wherein the telephony audio comprises a voice call process after a voice call is established.

10. The method of claim 1, wherein the first audio is associated with a social application installed on the electronic device, wherein the first audio comprises a voice message, and wherein the second audio is associated with a multimedia application installed on the electronic device.

11. A method, comprising:
    establishing a BLUETOOTH coupling to an external audio device;
    sending first audio associated with a first application to the external audio device over the BLUETOOTH coupling to enable the external audio device to play the first audio using a first speaker of the external audio device;
    displaying, through a display of an electronic device, a settings interface for the electronic device;
    receiving, through the settings interface and from a user, a privacy setting for the electronic device;
    obtaining second audio associated with a second application while sending the first audio to the external audio device, wherein the first application and the second application comprise different applications, wherein a first application type of the first application is a non-privacy application, and wherein a second application type of the second application is a privacy application; and simultaneously continuing to send, based on the first application type of the first application being the non-privacy application, the first audio to the external audio device through the BLUETOOTH coupling and playing, based on the second application type of the second application being the privacy application and based on the privacy setting for the electronic device, the second audio using a second speaker of the electronic device instead of the electronic device playing the first audio while the external audio device continues to play the first audio using the first speaker of the external audio device.

12. The method of claim 11, further comprising identifying, based on the second application type of the second application being the privacy application, that the second audio is associated with the electronic device.

13. The method of claim 11, further comprising storing associations between the first application and the first application type and between the second application and the second application type.

14. The method of claim 11, wherein a quantity of historical times of playing the first audio associated with the first application using the electronic device is greater than or equal to a first threshold.

15. The method of claim 11, further comprising displaying an interface of the first application.

16. The method of claim 11, further comprising obtaining an instruction from the user to play the second audio on the electronic device.

17. The method of claim 11, further comprising presenting user prompt information to prompt the user to identify that the first application type of the first application is the non-privacy application and that the second application type of the second application is the privacy application.

18. The method of claim 11, wherein the first application and the second application are different multimedia applications installed on the electronic device.

19. The method of claim 11, wherein the first audio comprises telephony audio, and wherein the telephony audio comprises a voice message in a voice call process after a voice call is established.

20. An apparatus, comprising:
a memory configured to store instructions; and
one or more processors coupled to the memory and configured to execute the instructions to cause the apparatus to:
 establish a BLUETOOTH coupling between the apparatus and an external audio device;
 play first audio associated with a first application using a first speaker of the apparatus;
 display, through a display of the apparatus, a settings interface for the apparatus;
 receive, through the settings interface and from a user, a privacy setting for the apparatus;
 obtain second audio associated with a second application while playing the first audio using the first speaker of the apparatus, wherein the first application and the second application comprise different applications, wherein a first application type of the first application is a privacy application, and wherein a second application type of the second application is a non-privacy application; and
simultaneously continue to play, based on the first application type of the first application being the privacy application and based on the privacy setting of the apparatus, the first audio using the first speaker of the apparatus and send, based on the second application type of the second application being the non-privacy application, the second audio to the external audio device through the BLUETOOTH coupling to enable the external audio device to play the second audio using a second speaker of the external audio device instead of the apparatus playing the second audio while the apparatus continues to play the first audio using the first speaker of the apparatus.

\* \* \* \* \*